United States Patent
Liu et al.

(10) Patent No.: US 10,505,694 B2
(45) Date of Patent: Dec. 10, 2019

(54) CSI MEASUREMENT AND FEEDBACK METHOD, AND DEVICE

(71) Applicant: Huawei Technologies Co., Ltd., Shenzhen (CN)

(72) Inventors: Kunpeng Liu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 15/729,325

(22) Filed: Oct. 10, 2017

(65) Prior Publication Data

US 2018/0034615 A1 Feb. 1, 2018

Related U.S. Application Data

(63) Continuation of application No. PCT/CN2016/078394, filed on Apr. 1, 2016.

(30) Foreign Application Priority Data

Apr. 10, 2015 (WO) ................ PCT/CN2015/076384

(51) Int. Cl.
*H04L 5/00* (2006.01)
*H04W 24/10* (2009.01)
(Continued)

(52) U.S. Cl.
CPC .......... *H04L 5/0057* (2013.01); *H04L 5/0048* (2013.01); *H04W 24/10* (2013.01); *H04W 72/0413* (2013.01); *H04W 72/085* (2013.01)

(58) Field of Classification Search
None
See application file for complete search history.

(56) References Cited

U.S. PATENT DOCUMENTS

2007/0082620 A1 4/2007 Zhang et al.
2012/0269290 A1 10/2012 Onggosanusi et al.
(Continued)

FOREIGN PATENT DOCUMENTS

CN 101841354 A 9/2010
CN 101888289 A 11/2010
(Continued)

OTHER PUBLICATIONS

"WF on Aperiodic PUSCH CQI Models in Rel. 10," 3GPP TSG RAN WG1 #62, Madrid, Spain, R1-105010, PowerPoint, 3rd Generation Partnership Project, Valbonne, France (Aug. 23-27, 2010).

(Continued)

*Primary Examiner* — Diane L Lo
(74) *Attorney, Agent, or Firm* — Leydig, Voit & Mayer, Ltd.

(57) ABSTRACT

Embodiments of the present invention relate to the field of communications technologies, and disclose a CSI measurement and feedback method and a device, so as to resolve a conventional-art problem that flexibility is poor when the UE measures a measurement pilot and provides a feedback. In a specific solution, a first network device sends a first signal to a second network device. The first signal is used for the second network device to determine a first measurement pilot according to the first signal, and send the first measurement pilot to the first network device. The first network device receives the first measurement pilot sent by the second network device, and measures the first measurement pilot to obtain first CSI. The first CSI includes at least one of a CQI, a PMI, an RI, or port selection information.

18 Claims, 15 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2013/0039199 | A1 | 2/2013 | Liao et al. |
| 2014/0254419 | A1 | 9/2014 | Chun et al. |
| 2014/0329553 | A1* | 11/2014 | Nakashima ......... H04W 52/365 455/522 |
| 2015/0098346 | A1 | 4/2015 | Guo et al. |
| 2015/0289155 | A1* | 10/2015 | Gao ................ H04L 5/0057 370/252 |

FOREIGN PATENT DOCUMENTS

| | | |
|---|---|---|
| CN | 102281635 A | 12/2011 |
| CN | 102377531 A | 3/2012 |
| CN | 103052102 A | 4/2013 |
| CN | 103716116 A | 4/2014 |
| CN | 104253639 A | 12/2014 |
| EP | 2665220 A1 | 11/2013 |
| WO | 2012124552 A1 | 9/2012 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211, V12.5.0, pp. 1-136, 3rd Generation Partnership Project, Valbonne, France (Mar. 2015).

"3rd Generation Partnership Project; Technical Specification Group Radio Access Network; Evolved Universal Terrestrial Radio Access (E-UTRA); Multiplexing and channel coding (Release 12)," 3GPP TS 36.212, V12.4.0, pp. 1-94, 3rd Generation Partnership Project, Valbonne, France (Mar. 2015).

"3rd Generation Partnership Project; Technical Specification Group Radio Access Network; Evolved Universal Terrestrial Radio Access (E-UTRA); Physical layer procedures (Release 12)," 3GPP TS 36.213, V12.5.0, pp. 1-239, 3rd Generation Partnership Project, Valbonne, France (Mar. 2015).

"Flexible CoMP Operation based on Dedicated CSI-RS Configuration", 3GPP TSG RAN WG1 Meeting #66b R1-113124, 3rd Generation Partnership Project, Valbonne, France (Oct. 10-14, 2011).

"Discussion on Aperiodic and Beamformed CSI-RS schemes", 3GPP TSG RAN WG1 Meeting #80 R1-150164,3rd Generation Partnership Project, Valbonne, France (Feb. 9-13, 2015).

* cited by examiner

CSI MEASUREMENT AND FEEDBACK METHOD, AND DEVICE

CROSS-REFERENCE TO RELATED APPLICATION

This application is a continuation of International Application No. PCT/CN2016/078394, filed on Apr. 1, 2016, which claims priority to International Application No. PCT/CN2015/076384, filed on Apr. 10, 2015. The disclosures of the aforementioned applications are hereby incorporated by reference in their entireties.

TECHNICAL FIELD

The embodiments of the present invention relate to the field of communications technologies, and in particular, to a channel state information (CSI for short) measurement and feedback method, and a device.

BACKGROUND

A quantity of downlink antenna ports in an existing Long Term Evolution (LTE for short) system may be one, two, four, eight, or the like. There is a maximum of eight antenna ports. Correspondingly, there is a maximum of eight ports in a measurement pilot configured by a base station.

In the conventional art, during CSI measurement, user equipment (UE for short) first obtains configuration information of a measurement pilot (for example, a port quantity of the measurement pilot or a pilot pattern of the measurement pilot), then measures, according to the configuration information of the measurement pilot, the measurement pilot sent by a base station, to obtain CSI, and finally, reports the CSI to the base station. In a CSI measurement process, the measurement pilot configured by the base station does not change. That is, when there is a given quantity of ports and the base station selects a given pilot pattern, the base station keeps sending the fixedly configured measurement pilot according to the selected pilot pattern, and the UE also keeps receiving the measurement pilot according to the pilot pattern, measures the measurement pilot, and provides a feedback.

However, there is a problem: In a CSI measurement process, the UE measures a fixedly configured measurement pilot and provides a feedback, repeatedly, and flexibility is poor.

SUMMARY

Embodiments of the present invention provide a CSI measurement and feedback method and a device, so as to resolve a conventional-art problem that flexibility is poor when UE measures a measurement pilot and provides a feedback.

According to a first aspect of the embodiments of the present invention, a channel state information CSI measurement and feedback method is provided, including:

sending, by a first network device, a first signal to a second network device, where the first signal is used for the second network device to determine a first measurement pilot according to the first signal, and send the first measurement pilot to the first network device;

receiving, by the first network device, the first measurement pilot sent by the second network device, and measuring the first measurement pilot to obtain first CSI, where the first CSI includes at least one of a channel quality indicator CQI, a precoding matrix indicator PMI, a rank indication RI, or port selection information, and the port selection information is used to indicate a port number of a port selected by the first network device from ports in the first measurement pilot; and sending, by the first network device, the first CSI to the second network device.

Optionally, the first signal is an uplink sounding reference signal SRS.

Optionally, the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, before the receiving, by the first network device, the first measurement pilot sent by the second network device, and measuring the first measurement pilot, the method further includes:

determining, by the first network device, configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the determining, by the first network device, configuration information of the first measurement pilot includes:

determining, by the first network device, the configuration information of the first measurement pilot according to the first signal.

Optionally, the determining, by the first network device, the configuration information of the first measurement pilot according to the first signal includes:

determining, by the first network device, the configuration information of the first measurement pilot according to a first signal last sent by the first network device to the second network device.

Optionally, the determining, by the first network device, the configuration information of the first measurement pilot according to a first signal last sent by the first network device to the second network device includes:

determining, by the first network device, the pilot pattern of the first measurement pilot according to a PMI in the first signal last sent by the first network device to the second network device, where there is a correspondence between PMIs and pilot patterns; or determining, by the first network device, the pilot pattern of the first measurement pilot according to an RI in the first signal last sent by the first network device to the second network device, where there is a correspondence between RIs and pilot patterns.

Optionally, if an RI is lower than the another RI, a pilot pattern corresponding to the RI is a subset of pilot patterns corresponding to the another RI.

Optionally, the determining, by the first network device, configuration information of the first measurement pilot includes:

receiving, by the first network device, first signaling sent by the second network device, where the first signaling carries the configuration information of the first measurement pilot; and determining, by the first network device, the configuration information of the first measurement pilot according to the first signaling, where the first signaling is higher layer signaling, or the first signaling is dynamic signaling specific to the first network device, or the first signaling is dynamic signaling specific to the first network device group.

Optionally, the dynamic signaling specific to the first network device is added to a physical downlink control channel PDCCH or an enhanced physical downlink control channel EPDCCH and sent.

Optionally, the dynamic signaling specific to the first network device is DL grant signaling or UL grant signaling.

Optionally, the dynamic signaling specific to the first network device group is added to a PDCCH or an EPDCCH and sent.

Optionally, the dynamic signaling specific to the first network device group is dynamic signaling obtained after scrambling is performed by using an identifier of a group to which the first network device belongs.

Optionally, the determining, by the first network device, the configuration information of the first measurement pilot according to the first signaling includes:

determining, by the first network device according to the higher layer signaling, an identifier of a group to which the first network device belongs, and determining, according to the identifier of the group to which the first network device belongs, the configuration information of the first measurement pilot from the dynamic signaling specific to the first network device group; or determining, by the first network device according to the higher layer signaling, an identifier of a group to which the first network device belongs, and determining, according to the identifier of the group to which the first network device belongs and an identifier of the first network device, the configuration information of the first measurement pilot from the dynamic signaling specific to the first network device group; or determining, by the first network device according to the first signal, an identifier of a group to which the first network device belongs, and determining, according to the identifier of the group to which the first network device belongs and an identifier of the first network device, the configuration information of the first measurement pilot from the dynamic signaling specific to the first network device group.

Optionally, the determining, by the first network device according to the first signal, an identifier of a group to which the first network device belongs includes:

determining, by the first network device according to the port selection information included in the second CSI and a first mapping relationship, the identifier of the group to which the first network device belongs, where the first mapping relationship is used to indicate a correspondence between a port number and the identifier of the group to which the first network device belongs; or determining, by the first network device according to the subband information included in the second CSI and a second mapping relationship, the identifier of the group to which the first network device belongs, where the second mapping relationship is used to indicate a correspondence between the subband information and the identifier of the group to which the first network device belongs; or sending, by the first network device, the first signal to the second network device, and receiving the identifier of the group to which the first network device belongs, where the identifier of the group to which the first network device belongs is sent by the second network device, and is determined by the second network device according to the first signal.

Optionally, before the sending, by a first network device, a first signal to a second network device, the method further includes:

receiving, by the first network device, the second measurement pilot sent by the second network device; and measuring, by the first network device, the second measurement pilot to obtain the second CSI, and determining the first signal according to the second CSI.

Optionally, the port selection information included in the second CSI is used to indicate port numbers of N ports selected by the first network device from M ports, where M is a port quantity of the second measurement pilot, and N<M.

Optionally, the port numbers of the N ports selected by the first network device from the M ports are specifically:

first N port numbers with highest signal quality that are obtained by the first network device by measuring M second measurement pilots and sorting signal quality of the M second measurement pilots in descending order, where the first N port numbers are corresponding to the second measurement pilot.

Optionally, the determining, by the first network device, the configuration information of the first measurement pilot according to the first signal specifically includes:

determining, by the first network device, the port quantity of the first measurement pilot as N according to the first signal.

Optionally, the determining, by the first network device, the configuration information of the first measurement pilot according to the first signal specifically includes: determining, by the first network device, the period of the first measurement pilot according to the first signal and a third mapping relationship, where the third mapping relationship is used to indicate a correspondence between the port quantity of the first measurement pilot and the period of the first measurement pilot.

Optionally, the determining, by the first network device, the configuration information of the first measurement pilot according to the first signal specifically includes:

determining, by the first network device, the sequence information of the first measurement pilot according to the first signal and a fourth mapping relationship, where the fourth mapping relationship is used to indicate a correspondence between the port quantity of the first measurement pilot and the sequence information of the first measurement pilot.

Optionally, configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, before the measuring, by the first network device, the second measurement pilot, the method further includes:

receiving, by the first network device, second signaling sent by the second network device, where the second signaling carries the configuration information of the second measurement pilot; and determining, by the first network device, the configuration information of the first measurement pilot according to the second signaling, where the second signaling is semi-static signaling, or the second signaling is dynamic signaling specific to the first network device group.

Optionally, the second measurement pilot and the first measurement pilot belong to different CSI measurement processes.

Optionally, the second measurement pilot and the first measurement pilot belong to a same CSI measurement process.

Optionally, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Optionally, the first network device reports third CSI in a CSI measurement process, where the third CSI includes the first CSI determined by measuring the first measurement pilot and the second CSI determined by measuring the second measurement pilot.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, when the first network device feeds back at least one of the second RI, the index corresponding to the first precoding submatrix, the index corresponding to the second precoding submatrix, or the second CQI in the second CSI to the second network device at the same time point, a joint coding manner or an independent coding manner is used for coding.

Optionally, the third CSI further includes a change indicator; and the change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Optionally, the change flag and the at least one of the second RI, the index corresponding to the first precoding submatrix, the index corresponding to the second precoding submatrix, or the second CQI are fed back at a same time point; or the change flag, the second RI, and a precoding type indicator PTI are fed back at a same time point.

Optionally, the method further includes:
before the first network device reports the change flag to the second network device, measuring, by the first network device, only the first measurement pilot, and feeding back the first CSI; and after the first network device reports the change flag to the second network device, measuring, by the first network device, only the second measurement pilot, and feeding back the second CSI; or before the first network device reports the change flag to the second network device, measuring, by the first network device, only the second measurement pilot, and reporting the second CSI; and after the first network device reports the change flag to the second network device, measuring, by the first network device, only the first measurement pilot, and feeding back the first CSI.

Optionally, the method further includes:
before the first network device feeds back the change flag to the second network device, measuring, by the first network device, only the first measurement pilot, and feeding back the first CSI; and after the first network device feeds back the change flag to the second network device, measuring, by the first network device, the first measurement pilot, feeding back the first CSI, measuring the second measurement pilot, and feeding back the second CSI; or before the first network device feeds back the change flag to the second network device, measuring, by the first network device, only the second measurement pilot, and feeding back the second CSI; and after the first network device feeds back the change flag to the second network device, measuring, by the first network device, the first measurement pilot, feeding back the first CSI, measuring the second measurement pilot, and feeding back the second CSI.

Optionally, the method further includes:
receiving, by the first network device, the configuration information sent by the second network device, where the configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;
when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\}, (Y_1, Y_2) \in \{(e_m, e_m),$$

$(e_m, e_n)\};$ when a rank is 3, $$W \in C = \left\{ \frac{1}{x}\begin{bmatrix} Y_1 & Y_2 \\ Y_1 & -Y_2 \end{bmatrix} \right\}, \text{ and}$$

$$(Y_1, Y_2) \in \begin{cases} (e_1, [e_1\ e_5]) & (e_2, [e_2\ e_6]) & (e_3, [e_3\ e_7]) & (e_4, [e_4\ e_8]) \\ (e_5, [e_1\ e_5]) & (e_6, [e_2\ e_6]) & (e_7, [e_3\ e_7]) & (e_8, [e_4\ e_8]) \\ ([e_1\ e_5], e_5) & ([e_2\ e_6], e_6) & ([e_3\ e_7], e_7) & ([e_4\ e_8], e_8) \\ ([e_5\ e_1], e_1) & ([e_6\ e_2], e_2) & ([e_7\ e_3], e_3) & ([e_8\ e_4], e_4) \end{cases};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$Y \in \{[e_1\ e_5], [e_2\ e_6], [e_3\ e_7], [e_4\ e_8]\};$ when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and
when a rank is 8, $$W \in C = \left\{ \begin{bmatrix} Y^{(0)} & 0 \\ 0 & Y^{(0)} \end{bmatrix} \right\}, \text{ and}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;
when a rank is 1, $W \in C = \{Y\}, Y \in \{e_1, e_2, K, e_M\};$ when a rank is 2, $W \in C = \{Y_1, Y_2\}, Y_1, Y_2 \in \{e_1, e_2, K, e_M\};$ when a rank is 3, $W \in C = \{Y_1, Y_2, Y_3\}, Y_1, Y_2, Y_3 \in \{e_1, e_2, K, e_M\};$ when a rank is 4, $W \in C = \{Y_1, Y_2, Y_3, Y_4\}, Y_1, Y_2, Y_3, Y_4 \in \{e_1, e_2, K, e_M\};$ when a rank is 5, $W \in C = \{Y_1, Y_2, Y_3, Y_4, Y_5\}, Y_1, Y_2, Y_3, Y_4, Y_5 \in \{e_1, e_2, K, e_M\};$ when a rank is 6, $W \in C = \{Y_1, Y_2, Y_3, Y_4, Y_5, Y_6\}, Y_1, Y_2, Y_3, Y_4, Y_5, Y_6 \in \{e_1, e_2, K, e_M\};$ when a rank is 7, $W \in C = \{Y_1, Y_2, Y_3, Y_4, Y_5, Y_6, Y_7\}, Y_1, Y_2, Y_3, Y_4, Y_5, Y_6, Y_7 \in \{e_1, e_2, K, e_M\};$ and when a rank is 8, $W \in C = \{Y_1, Y_2, Y_3, Y_4, Y_5, Y_6, Y_7, Y_8\},$ and $Y_1, Y_2, Y_3, Y_4, Y_5, Y_6, Y_7, Y_8 \in \{e_1, e_2, K, e_M\},$ where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner, or the port selection information included in the second CSI is expressed in a bit-map manner;

in the best-M manner, an index of the $r^{th}$ Q-combination from P ports is expressed as:

$$r = \sum_{i=0}^{Q-1} \left\langle \begin{matrix} P - K_i \\ Q - i \end{matrix} \right\rangle; \text{ and}$$

$$\left\langle \begin{matrix} x \\ y \end{matrix} \right\rangle = \begin{cases} \begin{pmatrix} x \\ y \end{pmatrix}, & x \geq y \\ 0, & x < y \end{cases}$$

represents a quantity of permutations and combinations of y chosen from x, where $1 \leq K_i \leq P$, and $$1 \leq r \leq \begin{pmatrix} P \\ Q \end{pmatrix}.$$

Optionally, the port selection information included in the second CSI is used to indicate a rank value range; or
the port selection information included in the second CSI is used to indicate a rank value range, and a value range of the RI included in the first CSI is the same as the rank value range indicated by the port selection information included in the second CSI; or
a value range of the RI included in the first CSI is determined by the first network device according to the port quantity of the first measurement pilot.

Optionally, the first network device is user equipment UE, and the second network device is a base station; or
the first network device is UE, and the second network device is UE; or
the first network device is a base station, and the second network device is a base station.

Optionally, the first measurement pilot is a channel state information measurement pilot CSI-RS.

Optionally, the second measurement pilot is a CSI-RS.

According to a second aspect of the embodiments of the present invention, a channel state information CSI measurement and feedback method is provided, including:
receiving, by a second network device, a first signal sent by a first network device, where the first signal is used for the second network device to determine a first measurement pilot according to the first signal;
determining, by the second network device, the first measurement pilot according to the first signal, and sending the first measurement pilot to the first network device; and
receiving, by the second network device, first CSI sent by the first network device, where the first CSI is obtained by measuring the first measurement pilot by the first network device, the first CSI includes at least one of a channel quality indicator CQI, a precoding matrix indicator PMI, a rank indication RI, or port selection information, and the port selection information is used to indicate a port number of a port selected by the first network device from ports in the first measurement pilot.

Optionally, the first signal is an uplink sounding reference signal SRS; or the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, the method further includes:

determining, by the second network device, configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the determining, by the second network device, configuration information of the first measurement pilot includes:

determining, by the second network device, the configuration information of the first measurement pilot according to the first signal.

Optionally, the determining, by the second network device, the configuration information of the first measurement pilot according to the first signal includes:

determining, by the second network device, the configuration information of the first measurement pilot according to a first signal last received.

Optionally, the determining, by the second network device, the configuration information of the first measurement pilot according to a first signal last received includes:

determining, by the second network device, the pilot pattern of the first measurement pilot according to a PMI in the first signal last received, where there is a correspondence between PMIs and pilot patterns; or determining, by the second network device, the pilot pattern of the first measurement pilot according to an RI in the first signal last received, where there is a correspondence between RIs and pilot patterns.

Optionally, if an RI is lower than the another RI, a pilot pattern corresponding to the RI is a subset of pilot patterns corresponding to the another RI.

Optionally, after the determining, by the second network device, configuration information of the first measurement pilot, the method further includes:

sending, by the second network device, first signaling to the first network device, where the first signaling carries the configuration information of the first measurement pilot; and the first signaling is higher layer signaling, or the first signaling is dynamic signaling specific to the first network device, or the first signaling is dynamic signaling specific to the first network device group.

Optionally, the second network device adds the dynamic signaling specific to the first network device to a physical downlink control channel PDCCH or an enhanced physical downlink control channel EPDCCH, and sends the PDCCH or the EPDCCH to the first network device.

Optionally, in a seventh possible implementation of the second aspect, the dynamic signaling specific to the first network device is DL grant signaling or UL grant signaling.

Optionally, the second network device adds the dynamic signaling specific to the first network device group to a PDCCH or an EPDCCH, and sends the PDCCH or the EPDCCH to the first network device.

Optionally, in a ninth possible implementation of the second aspect, the dynamic signaling specific to the first network device group is dynamic signaling obtained by performing scrambling by the second network device by using an identifier of a group to which the first network device belongs.

Optionally, the method further includes:

determining, by the second network device according to the first signal sent by the first network device, the identifier of the group to which the first network device belongs, and sending, to the first network device by using the higher layer signaling, the identifier of the group to which the first network device belongs.

Optionally, before the second network device receives the first signal sent by the first network device, the method further includes:

sending, by the second network device, the second measurement pilot to the first network device, to instruct the first network device to measure the second measurement pilot; and sending, by the second network device, second signaling to the first network device, where the second signaling carries configuration information of the second measurement pilot;

the second signaling is semi-static signaling, or the second signaling is dynamic signaling specific to the first network device group; the configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, the port selection information included in the second CSI is used to indicate port numbers of N ports selected by the first network device from M ports, where M is a port quantity of the second measurement pilot, and N<M.

Optionally, the determining, by the second network device, the configuration information of the first measurement pilot according to the first signal specifically includes:

determining, by the second network device, the port quantity of the first measurement pilot as N according to the first signal.

Optionally, the determining, by the second network device, the configuration information of the first measurement pilot according to the first signal specifically includes:

determining, by the second network device, the period of the first measurement pilot according to the first signal and a first mapping relationship, where the first mapping relationship is used to indicate a correspondence between the port quantity of the first measurement pilot and the period of the first measurement pilot.

Optionally, the determining, by the second network device, the configuration information of the first measurement pilot according to the first signal specifically includes:

determining, by the second network device, the sequence information of the first measurement pilot according to the first signal and a second mapping relationship, where the second mapping relationship is used to indicate a correspondence between the port quantity of the first measurement pilot and the sequence information of the first measurement pilot.

Optionally, the second measurement pilot and the first measurement pilot belong to different CSI measurement processes.

Optionally, the second measurement pilot and the first measurement pilot belong to a same CSI measurement process.

Optionally, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Optionally, the second network device receives, in a CSI measurement process, third CSI reported by the first network device, where the third CSI includes the first CSI determined by measuring the first measurement pilot and the second CSI determined by measuring the second measurement pilot.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is $W = W1 \times W2$, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, the second RI and the second PMI are reported at a same time point, and at least one of the second RI, the index corresponding to the first precoding submatrix, the index corresponding to the second precoding submatrix, or the second CQI in the second CSI is coded in a joint coding manner or an independent coding manner, where the at least one of the second RI, the index corresponding to the first precoding submatrix, the index corresponding to the second precoding submatrix, or the second CQI in the second CSI is fed back by the first network device and is received by the second network device at a same time point.

Optionally, the third CSI further includes a change indicator; and the change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Optionally, the change flag and the at least one of the second RI, the index corresponding to the first precoding submatrix, the index corresponding to the second precoding submatrix, or the second CQI are fed back at a same time point; or the change flag, the second RI, and a precoding type indicator PTI are fed back at a same time point.

Optionally, before the change flag reported by the first network device is received, the CSI reported by the first network device is the first CSI obtained by measuring only the first measurement pilot by the first network device; and after the change flag reported by the first network device is received, the CSI reported by the first network device is the second CSI obtained by measuring only the second measurement pilot by the first network device; or before the change flag reported by the first network device is received, the CSI reported by the first network device is the second CSI obtained by measuring only the second measurement pilot by the first network device; and after the change flag reported by the first network device is received, the CSI reported by the first network device is the first CSI obtained by measuring only the first measurement pilot by the first network device; or before the change flag reported by the first network device is received, the CSI reported by the first network device is the first CSI obtained by measuring only the first measurement pilot by the first network device; and after the change flag reported by the first network device is received, the CSI reported by the first network device includes the first CSI obtained by measuring the first measurement pilot by the first network device and the second CSI obtained by measuring the second measurement pilot by the first network device; or before the change flag reported by the first network device is received, the CSI reported by the first network device is the second CSI obtained by measuring only the second measurement pilot by the first network device; and after the change flag reported by the first network device is received, the CSI reported by the first network device includes the first CSI obtained by measuring the first measurement pilot by the first network device and the second CSI obtained by measuring the second measurement pilot by the first network device.

Optionally, the method further includes: sending, by the second network device, configuration information to the first network device, where the configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;

when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\},$$

$$(Y_1, Y_2) \in \{(e_m, e_m), (e_m, e_n)\};$$

when a rank is 3, $$W \in C = \left\{ \frac{1}{x}\begin{bmatrix} Y_1 & Y_2 \\ Y_1 & -Y_2 \end{bmatrix} \right\}, \text{ and}$$

$(Y_1, Y_2) \in$ $$\left\{\begin{matrix} (e_1, [e_1 \ e_5]) & (e_2, [e_2 \ e_6]) & (e_3, [e_3 \ e_7]) & (e_4, [e_4 \ e_8]) \\ (e_5, [e_1 \ e_5]) & (e_6, [e_2 \ e_6]) & (e_7, [e_3 \ e_7]) & (e_8, [e_4 \ e_8]) \\ ([e_1 \ e_5], e_5) & ([e_2 \ e_6], e_6) & ([e_3 \ e_7], e_7) & ([e_4 \ e_8], e_8) \\ ([e_5 \ e_1], e_1) & ([e_6 \ e_2], e_2) & ([e_7 \ e_3], e_3) & ([e_8 \ e_4], e_4) \end{matrix}\right\};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$$Y \in \{[e_1 \ e_5], [e_2 \ e_6], [e_3 \ e_7], [e_4 \ e_8]\};$$

when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and
when a rank is 8, $$W \in C = \left\{ \begin{bmatrix} Y^{(0)} & 0 \\ 0 & Y^{(0)} \end{bmatrix} \right\}, \text{ and}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;
when a rank is 1, $W \in C = \{Y\}, Y \in \{e_1, e_2, K, e_M\};$ when a rank is 2, $W \in C = \{Y_1, Y_2\}, Y_1, Y_2 \in \{e_1, e_2, K, e_M\};$ when a rank is 3, $W \in C = \{Y_1, Y_2, Y_3\}, Y_1, Y_2, Y_3 \in \{e_1, e_2, K, e_M\};$ when a rank is 4, $W \in C = \{Y_1, Y_2, Y_3, Y_4\}, Y_1, Y_2, Y_3, Y_4 \in \{e_1, e_2, K, e_M\};$ when a rank is 5, $W \in C = \{Y_1, Y_2, Y_3, Y_4, Y_5\}, Y_1, Y_2, Y_3, Y_4, Y_5 \in \{e_1, e_2, K, e_M\};$ when a rank is 6, $W \in C = \{Y_1, Y_2, Y_3, Y_4, Y_5, Y_6\}, Y_1, Y_2, Y_3, Y_4, Y_5, Y_6 \in \{e_1, e_2, K, e_M\};$ when a rank is 7, $W \in C = \{Y_1, Y_2, Y_3, Y_4, Y_5, Y_6, Y_7\}, Y_1, Y_2, Y_3, Y_4, Y_5, Y_6, Y_7 \in \{e_1, e_2, K, e_M\};$ and when a rank is 8, $W \in C = \{Y_1, Y_2, Y_3, Y_4, Y_5, Y_6, Y_7, Y_8\}$, and $Y_1, Y_2, Y_3, Y_4, Y_5, Y_6, Y_7, Y_8 \in \{e_1, e_2, K, e_M\}$, where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner, or the port selection information included in the second CSI is expressed in a bit-map manner; in the best-M manner, an index of the $r^{th}$ Q-combination from P ports is expressed as:

$$r = \sum_{i=0}^{Q-1} \binom{P-K_i}{Q-i}; \text{ and}$$

$$\binom{x}{y} = \begin{cases} \binom{x}{y}, & x \geq y \\ 0, & x < y \end{cases}$$

represents a quantity of permutations and combinations of y chosen from x, where $1 < K_i \leq P$, and $$1 \leq r \leq \binom{P}{Q}.$$

Optionally, the first network device is user equipment UE, and the second network device is a base station; or
the first network device is UE, and the second network device is UE; or
the first network device is a base station, and the second network device is a base station.

Optionally, the first measurement pilot is a channel state information measurement pilot CSI-RS.

Optionally, the second measurement pilot is a CSI-RS.

According to a third aspect of the embodiments of the present invention, a first network device is provided, including:
a sending unit, configured to send a first signal to a second network device, where the first signal is used for the second network device to determine a first measurement pilot according to the first signal, and send the first measurement pilot to the first network device;
a receiving unit, configured to receive the first measurement pilot sent by the second network device; and
a measurement unit, configured to measure the first measurement pilot to obtain first CSI, where the first CSI includes at least one of a channel quality indicator CQI, a precoding matrix indicator PMI, a rank indication RI, or port selection information, and the port selection information is used to indicate a port number of a port selected by the first network device from ports in the first measurement pilot, where
the sending unit is further configured to send the first CSI to the second network device.

Optionally, the first signal is an uplink sounding reference signal SRS; or the first signal includes second CSI sent by the sending unit to the second network device, the second CSI is obtained by measuring a second measurement pilot by the measurement unit, and the second measurement pilot is a measurement pilot configured for the first network device by the second network device by using semi-static signaling or signaling specific to a first network device group.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, the first network device further includes:
a determining unit, configured to: before the receiving unit receives the first measurement pilot sent by the second network device, and the first measurement pilot is measured, determine configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the determining unit is specifically configured to determine the configuration information of the first measurement pilot according to the first signal.

Optionally, the determining unit is specifically configured to determine the configuration information of the first measurement pilot according to a first signal last sent by the sending unit to the second network device.

Optionally, the determining unit is specifically configured to: determine the pilot pattern of the first measurement pilot according to a PMI in the first signal last sent by the sending unit to the second network device, where there is a correspondence between PMIs and pilot patterns; or determine the pilot pattern of the first measurement pilot according to an RI in the first signal last sent by the sending unit to the second network device, where there is a correspondence between RIs and pilot patterns.

Optionally, if an RI is lower than the another RI, a pilot pattern corresponding to the RI is a subset of pilot patterns corresponding to the another RI.

Optionally, the receiving unit is further configured to receive first signaling sent by the second network device, where the first signaling carries the configuration information of the first measurement pilot; and the determining unit is further configured to determine the configuration information of the first measurement pilot according to the first signaling, where the first signaling is at least one of higher layer signaling, dynamic signaling specific to the first network device, or dynamic signaling specific to the first network device group.

Optionally, the dynamic signaling specific to the first network device is added to a physical downlink control channel PDCCH or an enhanced physical downlink control channel EPDCCH and sent.

Optionally, in a seventh possible implementation of the third aspect, the dynamic signaling specific to the first network device is DL grant signaling or UL grant signaling.

Optionally, the dynamic signaling specific to the first network device group is added to a PDCCH or an EPDCCH and sent.

Optionally, in a ninth possible implementation of the third aspect, the dynamic signaling specific to the first network device group is dynamic signaling obtained after scrambling is performed by using an identifier of a group to which the first network device belongs.

Optionally, the determining unit is further configured to: determine, according to the higher layer signaling, an identifier of a group to which the first network device belongs, and determine, according to the identifier of the group to which the first network device belongs, the configuration information of the first measurement pilot from the dynamic signaling specific to the first network device group; or determine, according to the higher layer signaling, an identifier of a group to which the first network device belongs, and determine, according to the identifier of the group to which the first network device belongs and an identifier of the first network device, the configuration information of the first measurement pilot from the dynamic signaling specific to the first network device group; or determine, according to the first signal, an identifier of a group to which the first network device belongs, and determine, according to the identifier of the group to which the first network device belongs and an identifier of the first network device, the configuration information of the first measurement pilot from the dynamic signaling specific to the first network device group.

Optionally, the determining unit is further configured to: determine, according to the port selection information included in the second CSI and a first mapping relationship, the identifier of the group to which the first network device belongs, where the first mapping relationship is used to indicate a correspondence between a port number and the identifier of the group to which the first network device belongs; or determine, according to the subband information included in the second CSI and a second mapping relationship, the identifier of the group to which the first network device belongs, where the second mapping relationship is used to indicate a correspondence between the subband information and the identifier of the group to which the first network device belongs; or the receiving unit is further configured to receive the identifier of the group to which the first network device belongs, where the identifier of the group to which the first network device belongs is sent by the second network device, and is determined by the second network device according to the first signal.

Optionally, the receiving unit is further configured to: before the sending unit sends the first signal to the second network device, receive the second measurement pilot sent by the second network device;

the measurement unit is further configured to measure the second measurement pilot to obtain the second CSI; and the determining unit is further configured to determine the first signal according to the second CSI.

Optionally, the port selection information included in the second CSI is used to indicate port numbers of N ports selected by the first network device from M ports, where M is a port quantity of the second measurement pilot, and N<M.

Optionally, the port numbers of the N ports selected by the first network device from the M ports are specifically:

first N port numbers with highest signal quality that are obtained by the first network device by measuring M second measurement pilots and sorting signal quality of the M second measurement pilots in descending order, where the first N port numbers are corresponding to the second measurement pilot.

Optionally, the determining unit is further configured to determine the port quantity of the first measurement pilot as N according to the first signal.

Optionally, the determining unit is further configured to determine the period of the first measurement pilot according to the first signal and a third mapping relationship, where the third mapping relationship is used to indicate a correspondence between the port quantity of the first measurement pilot and the period of the first measurement pilot; or optionally, the determining unit is further configured to determine the sequence information of the first measurement pilot according to the first signal and a fourth mapping relationship, where the fourth mapping relationship is used to indicate a correspondence between the port quantity of the first measurement pilot and the sequence information of the first measurement pilot.

Optionally, configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, the receiving unit is further configured to: before the measurement unit measures the second measurement pilot, receive second signaling sent by the second network device, where the second signaling carries the configuration information of the second measurement pilot; and the determining unit is further configured to determine the configuration information of the first measurement pilot according to the second signaling, where the second signaling is semi-static signaling, or the second signaling is dynamic signaling specific to the first network device group.

Optionally, the second measurement pilot and the first measurement pilot belong to different CSI measurement processes.

Optionally, the second measurement pilot and the first measurement pilot belong to a same CSI measurement process.

Optionally, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Optionally, the sending unit reports third CSI in a CSI measurement process, where the third CSI includes the first CSI determined by measuring the first measurement pilot and the second CSI determined by measuring the second measurement pilot.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, at least one of the second RI, the index corresponding to the first precoding submatrix, the index corresponding to the second precoding submatrix, or the second CQI in the second CSI is coded in a joint coding manner or an independent coding manner, where the at least one of the second RI, the index corresponding to the first precoding submatrix, the index corresponding to the second precoding submatrix, or the second CQI in the second CSI is fed back by the sending unit to the second network device at a same time point.

Optionally, the third CSI further includes a change indicator; and the change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Optionally, the sending unit feeds back the change flag and the at least one of the second RI, the index corresponding to the first precoding submatrix, the index corresponding to the second precoding submatrix, or the second CQI to the second network device at a same time point; or the sending unit feeds back the change flag, the second RI, and a precoding type indicator PTI to the second network device at a same time point.

Optionally, the measurement unit is further configured to: before the sending unit reports the change flag to the second network device, measure only the first measurement pilot, and feed back the first CSI; and after the sending unit reports the change flag to the second network device, measure only the second measurement pilot, and feed back the second CSI; or the measurement unit is further configured to: before the sending unit reports the change flag to the second network device, measure only the second measurement pilot, and report the second CSI; and after the sending unit reports the change flag to the second network device, measure only the first measurement pilot, and feed back the first CSI.

Optionally, the measurement unit is further configured to: before the sending unit feeds back the change flag to the second network device, measure only the first measurement pilot, and feed back the first CSI; and after the sending unit feeds back the change flag to the second network device, measure the first measurement pilot, feed back the first CSI, measure the second measurement pilot, and feed back the second CSI; or the measurement unit is further configured to: before the sending unit feeds back the change flag to the second network device, measure only the second measurement pilot, and feed back the second CSI; and after the sending unit feeds back the change flag to the second network device, measure the first measurement pilot, feed back the first CSI, measure the second measurement pilot, and feed back the second CSI.

Optionally, the receiving unit is further configured to receive the configuration information sent by the second network device, where the configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;

when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\},$$

$(Y_1, Y_2) \in \{(e_m, e_m), (e_m, e_n)\};$ when a rank is 3, $$W \in C = \left\{ \frac{1}{x}\begin{bmatrix} Y_1 & Y_2 \\ Y_1 & -Y_2 \end{bmatrix} \right\}, \text{ and}$$

$$(Y_1, Y_2) \in \begin{cases} (e_1, [e_1\ e_5]) & (e_2, [e_2\ e_6]) & (e_3, [e_3\ e_7]) & (e_4, [e_4\ e_8]) \\ (e_5, [e_1\ e_5]) & (e_6, [e_2\ e_6]) & (e_7, [e_3\ e_7]) & (e_8, [e_4\ e_8]) \\ ([e_1\ e_5], e_5) & ([e_2\ e_6], e_6) & ([e_3\ e_7], e_7) & ([e_4\ e_8], e_8) \\ ([e_5\ e_1], e_1) & ([e_6\ e_2], e_2) & ([e_7\ e_3], e_3) & ([e_8\ e_4], e_4) \end{cases};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$Y \in \{[e_1\ e_5], [e_2\ e_6], [e_3\ e_7], [e_4\ e_8]\};$ when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\},$$

-continued and $Y = \frac{1}{x}\begin{bmatrix} e_1 & e_1 & e_2 & e_2 & e_3 \\ e_1 & -e_1 & e_2 & -e_2 & e_3 \end{bmatrix}$;

when a rank is 6, $W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}$, and $Y = \frac{1}{x}\begin{bmatrix} e_1 & e_1 & e_2 & e_2 & e_3 \\ e_1 & -e_1 & e_2 & -e_2 & -e_3 \end{bmatrix}$;

when a rank is 7, $W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}$, and $Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix}$;

and
when a rank is 8, $W \in C = \left\{ \begin{bmatrix} Y^{(0)} & 0 \\ 0 & Y^{(0)} \end{bmatrix} \right\}$, and $Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix}$, where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;
when a rank is 1, $W \in C = \{Y\}, Y \in \{e_1, e_2, K, e_M\}$;

when a rank is 2, $W \in C = \{Y_1, Y_2\}, Y_1, Y_2 \in \{e_1, e_2, K, e_M\}$;

when a rank is 3, $W \in C = \{Y_1, Y_2, Y_3\}, Y_1, Y_2, Y_3 \in \{e_1, e_2, K, e_M\}$;

when a rank is 4, $W \in C = \{Y_1, Y_2, Y_3, Y_4\}, Y_1, Y_2, Y_3, Y_4 \in \{e_1, e_2, K, e_M\}$;

when a rank is 5, $W \in C = \{Y_1, Y_2, Y_3, Y_4, Y_5\}, Y_1, Y_2, Y_3, Y_4 \in \{e_1, e_2, K, e_M\}$;

when a rank is 6, $W \in C = \{Y_1, Y_2, Y_3, Y_4, Y_5, Y_6\}, Y_1, Y_2, Y_3, Y_4, Y_5, Y_6 \in \{e_1, e_2, K, e_M\}$;

when a rank is 7, $W \in C = \{Y_1, Y_2, Y_3, Y_4, Y_5, Y_6, Y_7\}, Y_1, Y_2, Y_3, Y_4, Y_5, Y_6, Y_7 \in \{e_1, e_2, K, e_M\}$; and when a rank is 8, $W \in C = \{Y_1, Y_2, Y_3, Y_4, Y_5, Y_6, Y_7, Y_8\}$, and $Y_1, Y_2, Y_3, Y_4, Y_5, Y_6, Y_7, Y_8 \in \{e_1, e_2, K, e_M\}$, where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner; in the best-M manner, an index of the $r^{th}$ Q-combination from P ports is expressed as:

$$r = \sum_{i=0}^{Q-1} \binom{P-K}{Q-i}; \text{ and } \binom{x}{y} = \begin{cases} \binom{x}{y}, & x \geq y \\ 0, & x < y \end{cases}$$

represents a quantity of permutations and combinations of y chosen from x, where $1 \leq K_i \leq P$, and $$1 \leq r \leq \binom{P}{Q}.$$

Optionally, the port selection information included in the second CSI is expressed in a bit-map manner.

Optionally, the first network device is user equipment UE, and the second network device is a base station; or
the first network device is UE, and the second network device is UE; or
the first network device is a base station, and the second network device is a base station.

Optionally, the first measurement pilot is a channel state information measurement pilot CSI-RS.

Optionally, the second measurement pilot is a CSI-RS.

According to a fourth aspect of the embodiments of the present invention, a second network device is provided, including:

a receiving unit, configured to receive a first signal sent by a first network device, where the first signal is used for the second network device to determine a first measurement pilot according to the first signal;

a determining unit, configured to determine the first measurement pilot according to the first signal; and a sending unit, configured to send the first measurement pilot to the first network device, where the receiving unit is further configured to receive first CSI sent by the first network device, where the first CSI is obtained by measuring the first measurement pilot by the first network device, the first CSI includes at least one of a channel quality indicator CQI, a precoding matrix indicator PMI, a rank indication RI, or port selection information, and the port selection information is used to indicate a port number of a port selected by the first network device from ports in the first measurement pilot.

Optionally, the first signal is an uplink sounding reference signal SRS; or the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, the determining unit is further configured to determine configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the determining unit is specifically configured to determine the configuration information of the first measurement pilot according to the first signal.

Optionally, the determining unit is specifically configured to determine the configuration information of the first measurement pilot according to a first signal last received by the receiving unit.

Optionally, the determining unit is specifically configured to:

determine the pilot pattern of the first measurement pilot according to a PMI in the first signal last received, where there is a correspondence between PMIs and pilot patterns; or determine the pilot pattern of the first measurement pilot according to an RI in the first signal last received, where there is a correspondence between RIs and pilot patterns.

Optionally, if an RI is lower than the another RI, a pilot pattern corresponding to the RI is a subset of pilot patterns corresponding to the another RI.

Optionally, the sending unit is further configured to: after the determining unit determines the configuration information of the first measurement pilot, send first signaling to the first network device, where the first signaling carries the configuration information of the first measurement pilot; and the first signaling is higher layer signaling, or the first signaling is dynamic signaling specific to the first network device, or the first signaling is dynamic signaling specific to the first network device group.

Optionally, the sending unit is specifically configured to: add the dynamic signaling specific to the first network device to a physical downlink control channel PDCCH or an enhanced physical downlink control channel EPDCCH, and send the PDCCH or the EPDCCH to the first network device.

Optionally, in a seventh possible implementation of the fourth aspect, the dynamic signaling specific to the first network device is DL grant signaling or UL grant signaling.

Optionally, the sending unit is specifically configured to: add the dynamic signaling specific to the first network device group to a PDCCH or an EPDCCH, and send the PDCCH or the EPDCCH to the first network device.

Optionally, in a ninth possible implementation of the fourth aspect, the dynamic signaling specific to the first network device group is dynamic signaling obtained by performing scrambling by the second network device by using an identifier of a group to which the first network device belongs.

Optionally, the determining unit is further configured to determine, according to the first signal sent by the first network device, the identifier of the group to which the first network device belongs; and the sending unit is further configured to send, to the first network device by using the higher layer signaling, the identifier of the group to which the first network device belongs.

Optionally, the sending unit is further configured to: before the receiving unit receives the first signal sent by the first network device, send the second measurement pilot to the first network device, to instruct the first network device to measure the second measurement pilot; and the sending unit is further configured to send second signaling to the first network device, where the second signaling carries configuration information of the second measurement pilot;

the second signaling is semi-static signaling, or the second signaling is dynamic signaling specific to the first network device group; the configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, the port selection information included in the second CSI is used to indicate port numbers of N ports selected by the first network device from M ports, where M is a port quantity of the second measurement pilot, and N<M.

Optionally, the determining unit is further configured to determine the port quantity of the first measurement pilot as N according to the first signal.

Optionally, the determining unit is further configured to determine the period of the first measurement pilot according to the first signal and a first mapping relationship, where the first mapping relationship is used to indicate a correspondence between the port quantity of the first measurement pilot and the period of the first measurement pilot.

Optionally, the determining unit is further configured to determine the sequence information of the first measurement pilot according to the first signal and a second mapping relationship, where the second mapping relationship is used to indicate a correspondence between the port quantity of the first measurement pilot and the sequence information of the first measurement pilot.

Optionally, the second measurement pilot and the first measurement pilot belong to different CSI measurement processes.

Optionally, the second measurement pilot and the first measurement pilot belong to a same CSI measurement process.

Optionally, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Optionally, the receiving unit receives, in a CSI measurement process, third CSI reported by the first network device, where the third CSI includes the first CSI determined by measuring the first measurement pilot and the second CSI determined by measuring the second measurement pilot.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, at least one of the second RI, the index corresponding to the first precoding submatrix, the index corresponding to the second precoding submatrix, or the second CQI in the second CSI is coded in a joint coding manner or an independent coding manner, where the at least one of the second RI, the index corresponding to the first precoding submatrix, the index corresponding to the second precoding submatrix, or the second CQI in the second CSI is fed back by the first network device, and is received by the receiving unit at a same time point.

Optionally, the third CSI further includes a change indicator; and the change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Optionally, the receiving unit is further configured to receive, at a same time point, the change flag and the at least one of the second RI, the index corresponding to the first precoding submatrix, the index corresponding to the second precoding submatrix, or the second CQI that are fed back by the first network device; or the receiving unit is further configured to receive, at a same time point, the change flag, the second RI and a precoding type indicator PTI, where the change flag and the second RI are fed back by the first network device.

Optionally, before the receiving unit receives the change flag reported by the first network device, the CSI received by the receiving unit is first CSI obtained by measuring only the first measurement pilot by the first network device; and after the receiving unit receives the change flag reported by the first network device, the CSI received by the receiving unit is second CSI obtained by measuring only the second measurement pilot by the first network device the first network device; or before the receiving unit receives the change flag reported by the first network device, the CSI received by the receiving unit is second CSI obtained by measuring only the second measurement pilot by the first network device; and after the receiving unit receives the change flag reported by the first network device, the CSI received by the receiving unit is first CSI obtained by measuring only the first measurement pilot by the first network device; or before the receiving unit receives the change flag reported by the first network device, the CSI received by the receiving unit is first CSI obtained by measuring only the first measurement pilot by the first network device; and after the receiving unit receives the change flag reported by the first network device, the CSI received by the receiving unit includes first CSI obtained by measuring the first measurement pilot by the first network device and second CSI obtained by measuring the second measurement pilot by the first network device; or before the receiving unit receives the change flag reported by the first network device, the CSI received by the receiving unit is obtained by measuring only the second measurement pilot by the first network device; and after the receiving unit receives the change flag reported by the first network device, the CSI received by the receiving unit includes first CSI obtained by measuring the first measurement pilot by the first network device and second CSI obtained by measuring the second measurement pilot by the first network device.

Optionally, the sending unit is further configured to send configuration information to the first network device; where the configuration information is used to instruct the first network device to report the first CSI based on the first measurement pilot; or the configuration information is used to instruct the first network device to report the second CSI based on the second measurement pilot.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;

when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\},$$

$(Y_1, Y_2) \in \{(e_m, e_m), (e_m, e_n)\};$ when a rank is 3, $$W \in C = \left\{ \frac{1}{x}\begin{bmatrix} Y_1 & Y_2 \\ Y_1 & -Y_2 \end{bmatrix} \right\}, \text{ and}$$

$$(Y_1, Y_2) \in \begin{cases} (e_1, [e_1 \; e_5]) & (e_2, [e_2 \; e_6]) & (e_3, [e_3 \; e_7]) & (e_4, [e_4 \; e_8]) \\ (e_5, [e_1 \; e_5]) & (e_6, [e_2 \; e_6]) & (e_7, [e_3 \; e_7]) & (e_8, [e_4 \; e_8]) \\ ([e_1 \; e_5], e_5) & ([e_2 \; e_6], e_6) & ([e_3 \; e_7], e_7) & ([e_4 \; e_8], e_8) \\ ([e_5 \; e_1], e_1) & ([e_6 \; e_2], e_2) & ([e_7 \; e_3], e_3) & ([e_8 \; e_4], e_4) \end{cases};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$Y \in \{[e_1 \; e_5], [e_2 \; e_6], [e_3 \; e_7], [e_4 \; e_8]\};$ when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and
when a rank is 8, $$W \in C = \left\{ \begin{bmatrix} Y^{(0)} & 0 \\ 0 & Y^{(0)} \end{bmatrix} \right\}, \text{ and}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;

when a rank is 1, $W \in C=\{Y\}, Y \in \{e_1, e_2, K, e_M\}$;

when a rank is 2, $W \in C=\{Y_1, Y_2\}, Y_1, Y_2 \in \{e_1, e_2, K, e_M\}$;

when a rank is 3, $W \in C=\{Y_1, Y_2, Y_3\}, Y_1, Y_2, Y_3 \in \{e_1, e_2, K, e_M\}$;

when a rank is 4, $W \in C=\{Y_1, Y_2, Y_3, Y_4\}, Y_1, Y_2, Y_3, Y_4 \in \{e_1, e_2, K, e_M\}$;

when a rank is 5, $W \in C=\{Y_1, Y_2, Y_3, Y_4\}, Y_1, Y_2, Y_3, Y_4, Y_5 \in \{e_1, e_2, K, e_M\}$;

when a rank is 6, $W \in C=\{Y_1, Y_2, Y_3, Y_4, Y_5, Y_6\}, Y_1, Y_2, Y_3, Y_4, Y_5, Y_6 \in \{e_1, e_2, K, e_M\}$;

when a rank is 7, $W \in C=\{Y_1, Y_2, Y_3, Y_4, Y_5, Y_6, Y_7\}, Y_1, Y_2, Y_3, Y_4, Y_5, Y_6, Y_7 \in \{e_1, e_2, K, e_M\}$; and when a rank is 8, $W \in C=\{Y_1, Y_2, Y_3, Y_4, Y_5, Y_6, Y_7, Y_8\}$, and $Y_1, Y_2, Y_3, Y_4, Y_5, Y_6, Y_7, Y_8 \in \{e_1, e_2, K, e_M\}$ where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner, or the port selection information included in the second CSI is expressed in a bit-map manner; in the best-M manner, an index of the $r^{th}$ Q-combination from P ports is expressed as:

$$r = \sum_{i=0}^{Q-1} \binom{P-K_i}{Q-i}; \text{ and } \binom{x}{y} = \begin{cases} \binom{x}{y}, & x \geq y \\ 0, & x < y \end{cases}$$

represents a quantity of permutations and combinations of y chosen from X, where $1 \leq K_i \leq P$, and $$1 \leq r \leq \binom{P}{Q}.$$

Optionally, the first network device is user equipment UE, and the second network device is a base station; or the first network device is UE, and the second network device is UE; or the first network device is a base station, and the second network device is a base station.

Optionally, the first measurement pilot is a channel state information measurement pilot CSI-RS.

Optionally, the second measurement pilot is a CSI-RS.

According to a fifth aspect of the embodiments of the present invention, a first network device is provided, including:

a transmitter, configured to send a first signal to a second network device, where the first signal is used for the second network device to determine a first measurement pilot according to the first signal, and send the first measurement pilot to the first network device;

a receiver, configured to receive the first measurement pilot sent by the second network device; and a processor, configured to: measure the first measurement pilot to obtain first CSI, and send the first CSI to the second network device, where the first CSI includes at least one of a channel quality indicator CQI, a precoding matrix indicator PMI, a rank indication RI, or port selection information, and the port selection information is used to indicate a port number of a port selected by the first network device from ports in the first measurement pilot.

Optionally, the first signal is an uplink sounding reference signal SRS; or the first signal includes second CSI sent by the transmitter to the second network device, the second CSI is obtained by measuring a second measurement pilot by the processor, and the second measurement pilot is a measurement pilot configured for the first network device by the second network device by using semi-static signaling or signaling specific to a first network device group.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, the processor is configured to: before the receiver receives the first measurement pilot sent by the second network device, and the first measurement pilot is measured, determine configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the processor is specifically configured to determine the configuration information of the first measurement pilot according to the first signal.

Optionally, the processor is specifically configured to determine the configuration information of the first measurement pilot according to a first signal last sent by the transmitter to the second network device.

Optionally, the processor is specifically configured to: determine the pilot pattern of the first measurement pilot according to a PMI in the first signal last received by the receiver, where there is a correspondence between PMIs and pilot patterns; or determine the pilot pattern of the first measurement pilot according to an RI in the first signal last received by the receiver, where there is a correspondence between RIs and pilot patterns.

Optionally, if an RI is lower than the another RI, a pilot pattern corresponding to the RI is a subset of pilot patterns corresponding to the another RI.

Optionally, the receiver is further configured to receive first signaling sent by the second network device, where the first signaling carries the configuration information of the first measurement pilot; and the processor is further configured to determine the configuration information of the first measurement pilot according to the first signaling, where the first signaling is at least one of higher layer signaling, dynamic signaling specific to the first network device, or dynamic signaling specific to the first network device group.

Optionally, the dynamic signaling specific to the first network device is added to a physical downlink control channel PDCCH or an enhanced physical downlink control channel EPDCCH and sent.

Optionally, the dynamic signaling specific to the first network device is DL grant signaling or UL grant signaling.

Optionally, the dynamic signaling specific to the first network device group is added to a PDCCH or an EPDCCH and sent.

Optionally, in a ninth possible implementation of the fifth aspect, the dynamic signaling specific to the first network device group is dynamic signaling obtained after scrambling is performed by using an identifier of a group to which the first network device belongs.

Optionally, the processor is further configured to: determine, according to the higher layer signaling, an identifier of a group to which the first network device belongs, and determine, according to the identifier of the group to which the first network device belongs, the configuration information of the first measurement pilot from the dynamic signaling specific to the first network device group; or determine, according to the higher layer signaling, an identifier of a group to which the first network device belongs, and determine, according to the identifier of the group to which the first network device belongs and an identifier of the first network device, the configuration information of the first measurement pilot from the dynamic signaling specific to the first network device group; or determine, according to the first signal, an identifier of a group to which the first network device belongs, and determine, according to the identifier of the group to which the first network device belongs and an identifier of the first network device, the configuration information of the first measurement pilot from the dynamic signaling specific to the first network device group.

Optionally, the processor is further configured to: determine, according to the port selection information included in the second CSI and a first mapping relationship, the identifier of the group to which the first network device belongs, where the first mapping relationship is used to indicate a correspondence between a port number and the identifier of the group to which the first network device belongs; or determine, according to the subband information included in the second CSI and a second mapping relationship, the identifier of the group to which the first network device belongs, where the second mapping relationship is used to indicate a correspondence between the subband information and the identifier of the group to which the first network device belongs; or the receiver is further configured to receive the identifier of the group to which the first network device belongs, where the identifier of the group to which the first network device belongs is sent by the second network device, and is determined by the second network device according to the first signal.

Optionally, the receiver is further configured to: before the transmitter sends the first signal to the second network device, receive the second measurement pilot sent by the second network device; and the processor is further configured to: measure the second measurement pilot to obtain the second CSI, and determine the first signal according to the second CSI.

Optionally, the port selection information included in the second CSI is used to indicate port numbers of N ports selected by the first network device from M ports, where M is a port quantity of the second measurement pilot, and N<M.

Optionally, the processor is further configured to: measure M second measurement pilots, sort signal quality of the M second measurement pilots in descending order, and select first N port numbers with highest signal quality that are corresponding to the second measurement pilot with highest signal quality.

Optionally, the processor is further configured to determine the port quantity of the first measurement pilot as N according to the first signal.

Optionally, the processor is further configured to determine the period of the first measurement pilot according to the first signal and a third mapping relationship, where the third mapping relationship is used to indicate a correspondence between the port quantity of the first measurement pilot and the period of the first measurement pilot.

Optionally, the processor is further configured to determine the sequence information of the first measurement pilot according to the first signal and a fourth mapping relationship, where the fourth mapping relationship is used to indicate a correspondence between the port quantity of the first measurement pilot and the sequence information of the first measurement pilot.

Optionally, configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, the receiver is further configured to: before the processor measures the second measurement pilot, receive second signaling sent by the second network device, where the second signaling carries the configuration information of the second measurement pilot; and the processor is further configured to determine the configuration information of the first measurement pilot according to the second signaling, where the second signaling is semi-static signaling, or the second signaling is dynamic signaling specific to the first network device group.

Optionally, the second measurement pilot and the first measurement pilot belong to different CSI measurement processes.

Optionally, the second measurement pilot and the first measurement pilot belong to a same CSI measurement process.

Optionally, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Optionally, the second network device receives, in a CSI measurement process, third CSI reported by the first network device, where the third CSI includes the first CSI determined by measuring the first measurement pilot and the second CSI determined by measuring the second measurement pilot.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, when the transmitter is further configured to feed back at least one of the second RI, the index corresponding to the first precoding submatrix, the index corresponding to the second precoding submatrix, or the second CQI in the second CSI to the second network device at the same time point, the processor codes, in a joint coding manner or an independent coding manner, information sent by the transmitter.

Optionally, the third CSI further includes a change indicator; and the change indicator is used to instruct the processor to measure the first measurement pilot to obtain the first CSI, and the transmitter feeds back the first CSI to the second network device; or the change indicator is used to instruct the processor to measure the second measurement pilot to obtain the second CSI, and the transmitter feeds back the second CSI to the second network device; or the change indicator is used to instruct the processor to: measure the first measurement pilot to obtain the first CSI, and measure the second measurement pilot to obtain the second CSI, and the transmitter feeds back the first CSI and the second CSI to the second network device.

Optionally, the transmitter is further configured to feed back the change flag and the at least one of the second RI, the index corresponding to the first precoding submatrix, the index corresponding to the second precoding submatrix, or the second CQI to the second network device at a same time point; or the transmitter is further configured to feed back the change flag, the second RI, and a precoding type indicator PTI to the second network device at a same time point.

Optionally, the processor is further configured to: before the transmitter reports the change flag to the second network device, measure only the first measurement pilot, and feed back the first CSI; and after the transmitter reports the change flag to the second network device, measure only the second measurement pilot, and feed back the second CSI; or the processor is further configured to: before the transmitter reports the change flag to the second network device, measure only the second measurement pilot, and report the second CSI; and after the transmitter reports the change flag to the second network device, measure only the first measurement pilot, and feed back the first CSI.

Optionally, the processor is further configured to: before the transmitter feeds back the change flag to the second network device, measure only the first measurement pilot, and feed back the first CSI; and after the transmitter feeds back the change flag to the second network device, measure the first measurement pilot, feed back the first CSI, measure the second measurement pilot, and feed back the second CSI; or the processor is further configured to: before the transmitter feeds back the change flag to the second network device, measure only the second measurement pilot, and feed back the second CSI; and after the transmitter feeds back the change flag to the second network device, measure first measurement pilot, feed back the first CSI, measure the second measurement pilot, and feed back the second CSI.

Optionally, the receiver is further configured to receive the configuration information sent by the second network device, where the configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;

when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\},$$

$(Y_1, Y_2) \in \{(e_m, e_m), (e_m, e_n)\};$ when a rank is 3, $$W \in C = \left\{ \frac{1}{x}\begin{bmatrix} Y_1 & Y_2 \\ Y_1 & -Y_2 \end{bmatrix} \right\}, \text{ and}$$

$(Y_1, Y_2) \in$ $$\left\{ \begin{matrix} (e_1, [e_1\ e_5]) & (e_2, [e_2\ e_6]) & (e_3, [e_3\ e_7]) & (e_4, [e_4\ e_8]) \\ (e_5, [e_1\ e_5]) & (e_6, [e_2\ e_6]) & (e_7, [e_3\ e_7]) & (e_8, [e_4\ e_8]) \\ ([e_1\ e_5], e_5) & ([e_2\ e_6], e_6) & ([e_3\ e_7], e_7) & ([e_4\ e_8], e_8) \\ ([e_5\ e_1], e_1) & ([e_6\ e_2], e_2) & ([e_7\ e_3], e_3) & ([e_8\ e_4], e_4) \end{matrix} \right\};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$Y \in \{[e_1\ e_5], [e_2\ e_6], [e_3\ e_7], [e_4\ e_8]\};$ when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and
when a rank is 8, $$W \in C = \left\{ \begin{bmatrix} Y^{(0)} & 0 \\ 0 & Y^{(0)} \end{bmatrix} \right\}, \text{ and}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;

when a rank is 1, $W \in C=\{Y\}, Y \in \{e_1, e_2, K, e_M\};$ when a rank is 2, $W \in C=\{Y_1, Y_2\}, Y_1, Y_2 \in \{e_1, e_2, K, e_M\};$ when a rank is 3, $W \in C=\{Y_1, Y_2, Y_3\}, Y_1, Y_2, Y_3 \in \{e_1, e_2, K, e_M\};$ when a rank is 4, $W \in C=\{Y_1, Y_2, Y_3, Y_4\}, Y_1, Y_2, Y_3 \in \{e_1, e_2, K, e_M\};$ when a rank is 5, $W \in C=\{Y_1, Y_2, Y_3, Y_4, Y_5,\}, Y_1, Y_2, Y_3, Y_4, Y_5 \in \{e_1, e_2, K, e_M\};$ when a rank is 6, $W \in C=\{Y_1, Y_2, Y_3, Y_4, Y_5, Y_6\}, Y_1, Y_2, Y_3, Y_4, Y_5, Y_6 \in \{e_1, e_2, K, e_M\};$ when a rank is 7, $W \in C==\{Y_1, Y_2, Y_3, Y_4, Y_5, Y_7\}, Y_1, Y_2, Y_3, Y_4, Y_5, Y_6, Y_7 \in \{e_1, e_2, K, e_M\};$ and when a rank is 8, $W \in C=\{Y_1, Y_2, Y_3, Y_4, Y_5, Y_6, Y_7, Y_8\}$ and $Y_1, Y_2, Y_3, Y_4, Y_5, Y_6, Y_7, Y_8 \in \{e_1, e_2, K, e_M\},$ where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner; in the best-M manner, an index of the $r^{th}$ Q-combination from P ports is expressed as:

$$r = \sum_{i=0}^{Q-1} \binom{P-K_i}{Q-i}; \text{ and } \binom{x}{y} = \begin{cases} \binom{x}{y}, & x \geq y \\ 0, & x < y \end{cases}$$

represents a quantity of permutations and combinations of x chosen from y, where $1 \leq K_i < P$, and $$1 \leq r \leq \binom{P}{Q}.$$

Optionally, the port selection information included in the second CSI is expressed in a bit-map manner.

Optionally, the first network device is user equipment UE, and the second network device is a base station; or the first network device is UE, and the second network device is UE; or the first network device is a base station, and the second network device is a base station.

Optionally, the first measurement pilot is a channel state information measurement pilot CSI-RS.

Optionally, the second measurement pilot is a CSI-RS.

According to a sixth aspect of the embodiments of the present invention, a second network device is provided, including:

a receiver, configured to receive a first signal sent by a first network device, where the first signal is used for the second network device to determine a first measurement pilot according to the first signal;

a processor, configured to determine the first measurement pilot according to the first signal; and a transmitter, configured to send the first measurement pilot to the first network device, where the receiver is further configured to receive first CSI sent by the first network device, where the first CSI is obtained by measuring the first measurement pilot by the first network device, the first CSI includes at least one of a channel quality indicator CQI, a precoding matrix indicator PMI, a rank indication RI, or port selection information, and the port selection information is used to indicate a port number of a port selected by the first network device from ports in the first measurement pilot.

Optionally, the first signal is an uplink sounding reference signal SRS; or the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Optionally, the processor is further configured to determine configuration information of the first measurement pilot, where the configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Optionally, the processor is specifically configured to determine the configuration information of the first measurement pilot according to the first signal.

Optionally, the processor is specifically configured to determine the configuration information of the first measurement pilot according to a first signal last received by the receiver.

Optionally, the processor is specifically configured to:

determine the pilot pattern of the first measurement pilot according to a PMI in the first signal last received by the receiver, where there is a correspondence between PMIs and pilot patterns; or determine the pilot pattern of the first measurement pilot according to an RI in the first signal last received by the receiver, where there is a correspondence between RIs and pilot patterns.

Optionally, if an RI is lower than the another RI, a pilot pattern corresponding to the RI is a subset of pilot patterns corresponding to the another RI.

Optionally, the transmitter is further configured to: after the processor determines the configuration information of the first measurement pilot, send first signaling to the first network device, where the first signaling carries the configuration information of the first measurement pilot; and the first signaling is higher layer signaling, or the first signaling is dynamic signaling specific to the first network device, or the first signaling is dynamic signaling specific to the first network device group.

Optionally, the transmitter is specifically configured to: add the dynamic signaling specific to the first network device to a physical downlink control channel PDCCH or an enhanced physical downlink control channel EPDCCH, and send the PDCCH or the EPDCCH to the first network device.

Optionally, the dynamic signaling specific to the first network device is DL grant signaling or UL grant signaling.

Optionally, the transmitter is specifically configured to: add the dynamic signaling specific to the first network device group to a PDCCH or an EPDCCH, and send the PDCCH or the EPDCCH to the first network device.

Optionally, in a ninth possible implementation of the sixth aspect, the dynamic signaling specific to the first network device group is dynamic signaling obtained by performing scrambling by the second network device by using an identifier of a group to which the first network device belongs.

Optionally, the processor is further configured to determine, according to the first signal sent by the first network device, the identifier of the group to which the first network device belongs; and the transmitter is further configured to send, to the first network device by using the higher layer signaling, the identifier of the group to which the first network device belongs.

Optionally, the transmitter is further configured to: before the receiver receives the first signal sent by the first network device, send the second measurement pilot to the first network device, to instruct the first network device to measure the second measurement pilot; and the transmitter is further configured to send second signaling to the first network device, where the second signaling carries configuration information of the second measurement pilot;

the second signaling is semi-static signaling, or the second signaling is dynamic signaling specific to the first network device group; the configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot; and in a CSI measurement process, the configuration information of the second measurement pilot remains unchanged.

Optionally, the second CSI includes at least one of a PMI, port selection information, or subband information; and the port selection information included in the second CSI is used to indicate a port number of a port selected by the first network device from ports in the second measurement pilot, and the subband information is used to indicate a subband selected by the first network device from a frequency band of the second measurement pilot.

Optionally, the port selection information included in the second CSI is used to indicate port numbers of N ports selected by the first network device from M ports, where M is a port quantity of the second measurement pilot, and N<M.

Optionally, the processor is further configured to determine the port quantity of the first measurement pilot as N according to the first signal.

Optionally, the processor is further configured to determine the period of the first measurement pilot according to the first signal and a first mapping relationship, where the first mapping relationship is used to indicate a correspondence between the port quantity of the first measurement pilot and the period of the first measurement pilot.

Optionally, the processor is further configured to determine the sequence information of the first measurement pilot according to the first signal and a second mapping relationship, where the second mapping relationship is used to indicate a correspondence between the port quantity of the first measurement pilot and the sequence information of the first measurement pilot.

Optionally, the second measurement pilot and the first measurement pilot belong to different CSI measurement processes.

Optionally, the second measurement pilot and the first measurement pilot belong to a same CSI measurement process.

Optionally, the first CSI includes a first RI, a first PMI, and a first CQI; or the first CSI includes a first PMI and a first CQI, where the first RI and the first PMI are determined by measuring the first measurement pilot, and the first CQI is a CQI determined according to the second RI and a precoding matrix corresponding to the first PMI.

Optionally, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points, where the second CQI is determined according to the second RI and the precoding matrix corresponding to the second PMI; the second RI and the second PMI are determined by measuring the second measurement pilot; the second PMI is corresponding to the precoding matrix that has the double codebook structure, and the second PMI includes the index corresponding to the first precoding submatrix and an index corresponding to the second precoding submatrix; and the double codebook structure is $W = W1 \times W2$, where $$W1 = \begin{bmatrix} U & 0 \\ 0 & U \end{bmatrix},$$

W1 is a diagonal matrix, W1 is the first precoding submatrix, and W2 is the second precoding submatrix.

Optionally, when the receiver receives, at a same time point, at least one of the second RI, the index corresponding to the first precoding submatrix, the index corresponding to the second precoding submatrix, or the second CQI in the second CSI fed back by the first network device, the feedback information received by the receiver is coded in a joint coding manner or an independent coding manner.

Optionally, the third CSI further includes a change indicator;

the change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Optionally, the receiver is further configured to receive, at a same time point, the change flag and the at least one of the second RI, the index corresponding to the first precoding submatrix, the index corresponding to the second precoding submatrix, or the second CQI that are fed back by the first network device; or the receiver is further configured to receive, at a same time point, the change flag, the second RI, and a precoding type indicator PTI, where the change flag and the second RI are fed back by the first network device.

Optionally, before the receiver receives the change flag reported by the first network device, the CSI received by the receiver is first CSI obtained by measuring only the first measurement pilot by the first network device; and after the receiver receives the change flag reported by the first network device, the CSI received by the receiver is second CSI obtained by measuring only the second measurement pilot by the first network device the first network device; or before the receiver receives the change flag reported by the first network device, the CSI received by the receiver is second CSI obtained by measuring only the second measurement pilot by the first network device; and after the receiver receives the change flag reported by the first network device, the CSI received by the receiver is first CSI obtained by measuring only the first measurement pilot by the first network device; or before the receiver receives the change flag reported by the first network device, the CSI received by the receiver is first CSI obtained by measuring only the first measurement pilot by the first network device; and after the receiver receives the change flag reported by the first network device, the CSI received by the receiver includes first CSI obtained by measuring the first measurement pilot by the first network device and second CSI obtained by measuring the second measurement pilot by the first network device; or before the receiver receives the change flag reported by the first network device, the CSI received by the receiver is obtained by measuring only the second measurement pilot by the first network device; and after the receiver receives the change flag reported by the first network device, the CSI received by the receiver includes first CSI obtained by measuring the first measurement pilot by the first network device and second CSI obtained by measuring the second measurement pilot by the first network device.

Optionally, the transmitter is further configured to send configuration information to the first network device, where the configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Optionally, in a CSI measurement process, the configuration information of the first measurement pilot is variable.

Optionally, in a CSI measurement process, the port quantity of the first measurement pilot is variable.

Optionally, the PMI in the first CSI includes a precoding matrix W;

when a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\}, (Y_1, Y_2) \in \{(e_m, e_m), (e_m, e_n)\};$$

when a rank is 3, $$W \in C = \left\{ \frac{1}{x}\begin{bmatrix} Y_1 & Y_2 \\ Y_1 & -Y_2 \end{bmatrix} \right\}, \text{ and}$$

$$(Y_1, Y_2) \in \begin{Bmatrix} (e_1, [e_1\ e_5]) & (e_2, [e_2\ e_6]) & (e_3, [e_3\ e_7]) & (e_4, [e_4\ e_8]) \\ (e_5, [e_1\ e_5]) & (e_6, [e_2\ e_6]) & (e_7, [e_3\ e_7]) & (e_8, [e_4\ e_8]) \\ ([e_1\ e_5], e_5) & ([e_2\ e_6], e_6) & ([e_3\ e_7], e_7) & ([e_4\ e_8], e_8) \\ ([e_5\ e_1], e_1) & ([e_6\ e_2], e_2) & ([e_7\ e_3], e_3) & ([e_8\ e_4], e_4) \end{Bmatrix};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and}$$

$$Y \in \{[e_1\ e_5], [e_2\ e_6], [e_3\ e_7], [e_4\ e_8]\};$$

when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \text{ and}$$

$$Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and when a rank is 8, $$W \in C = \left\{ \begin{bmatrix} Y^{(0)} & 0 \\ 0 & Y^{(0)} \end{bmatrix} \right\}, \text{ and}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

Optionally, the PMI in the first CSI includes a precoding matrix W;

when a rank is 1, $W \in C = \{Y\}, Y \in \{e_1, e_2, K, e_M\};$ when a rank is 2, $W \in C = \{Y_1, Y_2\}, Y_1, Y_2 \in \{e_1, e_2, K, e_M\};$ when a rank is 3, $W \in C = \{Y_1, Y_2, Y_3\}, Y_1, Y_2, Y_3 \in \{e_1, e_2, K, e_M\};$ when a rank is 4, $W \in C = \{Y_1, Y_2, Y_3, Y_4\}, Y_1, Y_2, Y_3, Y_4 \in \{e_1, e_2, K, e_M\};$ when a rank is 5, $W \in C = \{Y_1, Y_2, Y_3, Y_4\}, Y_1, Y_2, Y_3, Y_4, Y_5 \in \{e_1, e_2, K, e_M\};$ when a rank is 6, $W \in C = \{Y_1, Y_2, Y_3, Y_4, Y_5, Y_6\}, Y_1, Y_2, Y_3, Y_4, Y_5, Y_6 \in \{e_1, e_2, K, e_M\};$ when a rank is 7, $W \in C = \{Y_1, Y_2, Y_3, Y_4, Y_5, Y_6, Y_7\}, Y_1, Y_2, Y_3, Y_4, Y_5, Y_6, Y_7 \in \{e_1, e_2, K, e_M\};$ and when a rank is 8, $W \in C = \{Y_1, Y_2, Y_3, Y_4, Y_5, Y_6, Y_7\},$ and $Y_1, Y_2, Y_3, Y_4, Y_5, Y_6, Y_7 \in \{e_1, e_2, K, e_M\}$ where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is expressed in a best-M manner, or the port selection information included in the second CSI is expressed in a bit-map manner; in the best-M manner, an index of the $r^{th}$ Q-combination from P ports is expressed as:

$$r = \sum_{i=0}^{Q-1} \binom{P-K_i}{Q-i}; \text{ and } \binom{x}{y} = \begin{cases} \binom{x}{y}, & x \geq y \\ 0, & x < y \end{cases}$$

represents a quantity of permutations and combinations of y chosen from x, where $1 \leq K_i \leq P$, and $$1 \le r \le \binom{P}{Q}.$$

Optionally, the first network device is user equipment UE, and the second network device is a base station; or the first network device is UE, and the second network device is UE; or the first network device is a base station, and the second network device is a base station.

Optionally, the first measurement pilot is a channel state information measurement pilot CSI-RS.

Optionally, the second measurement pilot is a CSI-RS.

According to the CSI measurement and feedback method and the device provided in the embodiments of the present invention, before a first network device receives a first measurement pilot sent by a second network device, the first network device sends a first signal to the second network device, and the first signal is used for the second network device to determine the first measurement pilot according to the first signal. Therefore, the first measurement pilot changes along with a content change of the first signal, that is, the first measurement pilot in the embodiments of the present invention is variable. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in the embodiments of the present invention is adaptively configured by the base station. Therefore, a conventional-art problem that flexibility is poor when the UE measures a measurement pilot and provides a feedback can be resolved by using the method in the embodiments of the present invention.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Various technologies described in this specification may be applied to various wireless communications systems, such as a Long Term Evolution (LTE for short) system, an LTE-advanced (LTE-A for short) system, and another communications system of this type.

This specification describes various aspects with reference to a terminal and/or a base station.

User equipment (UE for short) may be a wireless terminal or a wired terminal. The wireless terminal may be a device that provides a user with voice and/or data connectivity, a handheld device with a radio connection function, or another processing device connected to a wireless modem. The wireless terminal may communicate with one or more core networks by using a radio access network (RAN for short). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS for short) phone, a cordless telephone set, a Session Initiation Protocol (SIP for short) phone, a wireless local loop (WLL for short) station, or a personal digital assistant (PDA for short). The wireless terminal may also be referred to as a subscriber unit, a subscriber station, a mobile station, a mobile), a remote station, an access point (AP for short), a remote terminal, an access terminal, a user terminal, a user agent, or the like.

The base station (for example, an access point) may be a device in communication with a wireless terminal by using one or more sectors at an air interface in an access network. The base station may be configured to perform conversion between a received over-the-air frame and an Internet Protocol (IP for short) packet and serve as a router between the wireless terminal and a rest part of the access network, where the rest part of the access network may include an IP network. The base station may further coordinate attribute management of the air interface. For example, the base station may be an evolved base station (eNB or e-NodeB for short) in the LTE system, and no limitation is imposed in the present invention.

In addition, the terms "system" and "network" may be used interchangeably in this specification.

Figure 1:
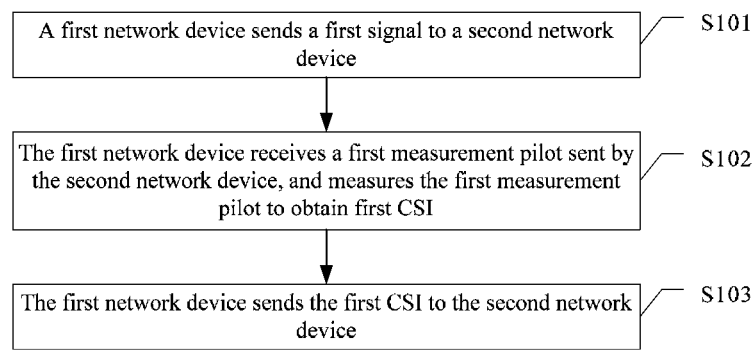
FIG. 1 is a flowchart of a CSI measurement and feedback method according to an embodiment of the present invention.

An embodiment of the present invention provides a CSI measurement and feedback method. As shown in FIG. 1, the method includes the following steps.

S101. A first network device sends a first signal to a second network device.

The first signal is used for the second network device to determine a first measurement pilot according to the first signal, and send the first measurement pilot to the first network device.

Optionally, the first network device is UE, and the second network device is a base station; or the first network device is UE, and the second network device is UE; or the first network device is a base station, and the second network device is a base station. The first network device and the second network device may be network devices in other forms, and no limitation is imposed herein on specific forms of the first network device and the second network device in this embodiment of the present invention.

Optionally, the first signal may include an uplink signal sent by the first network device to the second network device, for example, an uplink sounding reference signal (SRS for short); or the first signal may include a result of measuring, by the first network device, a downlink signal sent by the second network device. Herein, the uplink is from the first network device to the second network device, and the downlink is from the second network device to the first network device. Herein, no limitation is imposed on specific content of the uplink signal, specific content of the downlink signal, and specific content of the first signal in this embodiment of the present invention.

In a scenario in which uplink and downlink channels are symmetric, the first signal may be an uplink signal sent by the first network device to the second network device, and the second network device may estimate channel quality of a downlink channel according to the uplink signal and determine a first measurement pilot according to the estimated channel quality of the downlink channel.

The first network device sends the first signal to the second network device, to instruct the second network device to determine the first measurement pilot according to the first signal and send the first measurement pilot to the first network device. Therefore, the first measurement pilot changes along with a content change of the first signal, that is, compared with a fixed measurement pilot configured for a base station in the conventional art, the first measurement pilot in this embodiment of the present invention is variable.

S102. The first network device receives a first measurement pilot sent by the second network device, and measures the first measurement pilot to obtain first CSI.

The first CSI includes at least one of a channel quality indicator (CQI for short), a precoding matrix indicator (PMI for short), a rank indication (RI for short), or port selection information. The port selection information included in the first CSI is used to indicate a port number of a port selected by the first network device from ports in the first measurement pilot.

S103. The first network device sends the first CSI to the second network device.

According to the CSI measurement and feedback method provided in this embodiment of the present invention, before a first network device receives a first measurement pilot sent by a second network device, the first network device sends a first signal to the second network device, and the first signal is used for the second network device to determine the first measurement pilot according to the first signal. Therefore, the first measurement pilot changes along with a content change of the first signal, that is, the first measurement pilot in this embodiment of the present invention is variable. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 2:
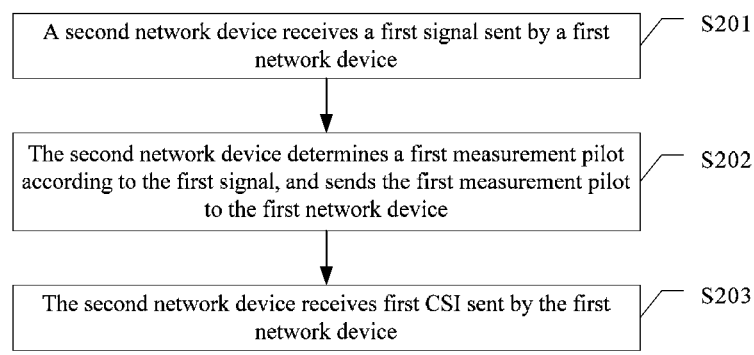
FIG. 2 is a flowchart of another CSI measurement and feedback method according to an embodiment of the present invention.

An embodiment of the present invention further provides a CSI measurement and feedback method. As shown in FIG. 2, the method includes the following steps.

S201. A second network device receives a first signal sent by a first network device.

The first signal is used for the second network device to determine a first measurement pilot according to the first signal.

For specific descriptions of the first network device, the second network device, and the first signal, reference may be made to related descriptions in S101, and no details are repeated herein in this embodiment of the present invention.

S202. The second network device determines a first measurement pilot according to the first signal, and sends the first measurement pilot to the first network device.

When the first signal is an uplink signal sent by the first network device to the second network device, the second network device may estimate channel quality of a downlink channel according to the uplink signal by using symmetry of uplink and downlink channels, and adaptively determine a first measurement pilot according to the estimated channel quality of the downlink channel.

When the first signal is a result of measuring, by the first network device, a downlink signal sent by the second network device, the measurement result may include information such as a port number of a measurement pilot that concerns the first network device, and the second network device may configure the first measurement pilot according to the information such as the port number of the measurement pilot that concerns the first network device, or certainly, the second network device may determine the first measurement pilot according to another policy. Herein, no specific limitation is imposed on how the second network device determines the first measurement pilot according to the first signal in this embodiment of the present invention.

S203. The second network device receives first CSI sent by the first network device.

The first CSI is obtained by the first network device by measuring the first measurement pilot. The first CSI includes at least one of a CQI, a PMI, an RI, or port selection information. The port selection information included in the first CSI is used to indicate a port number of a port selected by the first network device from ports in the first measurement pilot.

According to the CSI measurement and feedback method provided in this embodiment of the present invention, a second network device determines a first measurement pilot according to a first signal received from a first network device. Therefore, the first measurement pilot changes along with a content change of the first signal, that is, the first measurement pilot in this embodiment of the present invention is variable. When the first network device is UE, and the second network device is a base station, a first measurement pilot sent by the base station to the UE is determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 3:
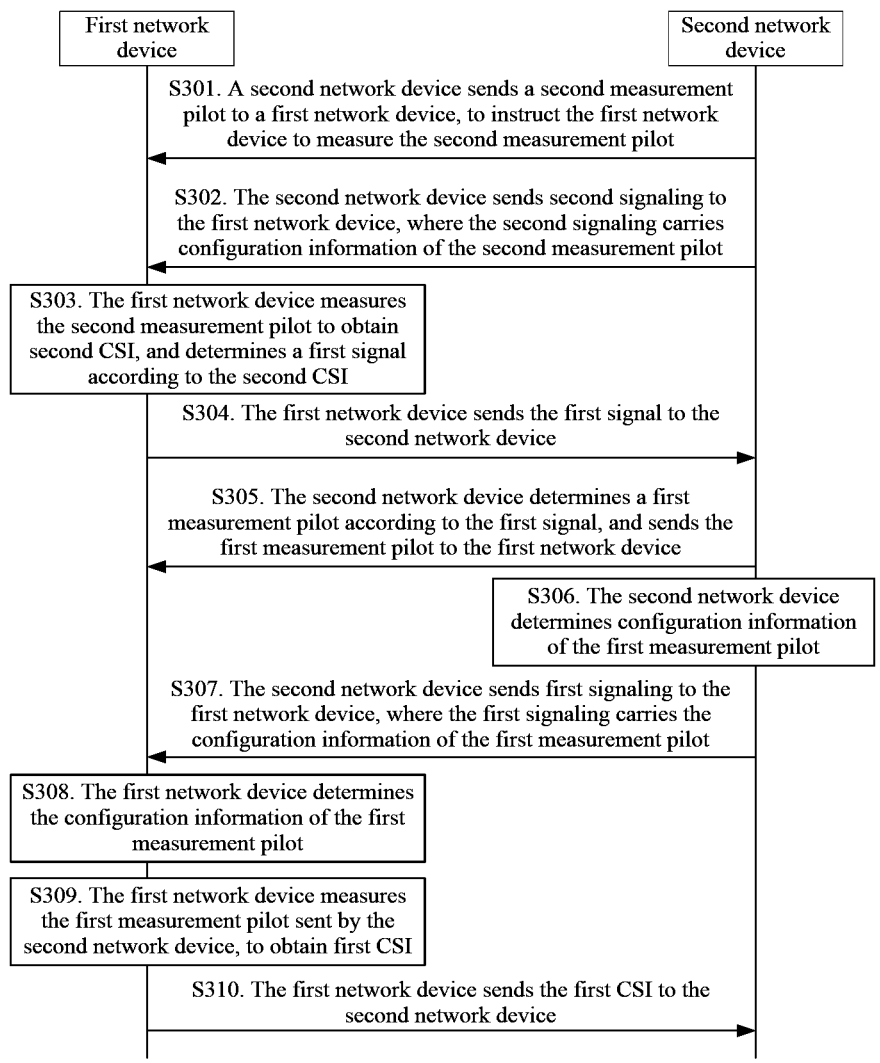
FIG. 3 is a flowchart of another CSI measurement and feedback method according to an embodiment of the present invention.

An embodiment of the present invention further provides a CSI measurement and feedback method. As shown in FIG. 3, the method includes the following steps.

S301. A second network device sends a second measurement pilot to a first network device, to instruct the first network device to measure the second measurement pilot.

Optionally, the first network device is UE, and the second network device is a base station; or the first network device is UE, and the second network device is UE; or the first network device is a base station, and the second network device is a base station. The first network device and the second network device may be network devices in other forms, and no limitation is imposed herein on specific forms of the first network device and the second network device in this embodiment of the present invention.

The second measurement pilot is a measurement pilot configured by the second network device by using semi-static signaling, signaling specific to a first network device group, or a policy of the second network device. In a CSI measurement process, the second measurement pilot remains unchanged. The second measurement pilot may be a channel state information measurement pilot (CSI-RS for short).

S302. The second network device sends second signaling to the first network device, where the second signaling carries configuration information of the second measurement pilot.

The second signaling is semi-static signaling, or the second signaling is dynamic signaling specific to the first network device group. The configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot. In a CSI measurement process, the configuration information of the second measurement pilot remains unchanged.

S303. The first network device measures the second measurement pilot to obtain second CSI, and determines a first signal according to the second CSI.

The first signal is used to instruct the second network device to determine a first measurement pilot according to the first signal, and send the first measurement pilot to the first network device. The first signal includes the second CSI.

Specifically, the second CSI may include at least one of a PMI, port selection information, or subband information. The port selection information included in the second CSI is used to indicate a port number of a port selected by the first network device from ports in the second measurement pilot, and the subband information is used to indicate a subband selected by the first network device from a frequency band of the second measurement pilot.

Further, the port selection information included in the second CSI is used to indicate port numbers of N ports selected by the first network device from M ports, where M is a port quantity of the second measurement pilot, and N<M.

Further, the port numbers of the N ports selected by the first network device from the M ports are specifically: first N port numbers with highest signal quality that are obtained by the first network device by measuring M second measurement pilots and sorting signal quality of the M second measurement pilots in descending order, where the first N port numbers are corresponding to the second measurement pilot.

For example, assuming that there are 16 ports in the second measurement pilot, that is, M=16, in S302, the first network device has obtained configuration information of the second measurement pilot. Therefore, the first network device may measure the second measurement pilot for the 16 ports, sort signal quality of the 16 second measurement pilots in descending order, and select first four port numbers corresponding to the second measurement pilot, that is, N=4. For example, four port numbers that are corresponding to the second measurement pilot and that are selected by the first network device are a port number 1, a port number 3, a port number 6, and a port number 7 respectively; in this case, the port selection information included in the second CSI is used to indicate the port number 1, the port number 3, the port number 6, and the port number 7.

In another situation, the first network device obtains, according to frequency band information of the second measurement pilot, that sending is performed on a subband 1 by using each of the port number 1, the port number 3, the port number 6, and the port number 7; in this case, the second CSI may include information about the subband 1. Therefore, the first signal determined by the first network device according to the second CSI may include at least one of the port selection information or the information about the subband 1.

Further, the port selection information included in the second CSI may be expressed in a best-M manner or a bit-map manner.

In the best-M manner, an index of the $r^{th}$ Q-combination from P ports is expressed as:

$$r = \sum_{i=0}^{Q-1} \binom{P - K_i}{Q - i}; \text{ and } \binom{x}{y} = \begin{cases} \binom{x}{y}, & x \geq y \\ 0, & x < y \end{cases} \quad \text{(formula 1)}$$

represents a quantity of permutations and combinations of y chosen from x, where $1 \leq K_t < P$, and $$1 \leq r \leq \binom{P}{Q}.$$

The bit-map manner may be used to code port selection information corresponding to different port selection manners to obtain unique bits. For specific descriptions of bit-Map, reference may be made to related descriptions in the conventional art, and no details are described herein in this embodiment of the present invention.

Further, the port selection information included in the second CSI may be used to indicate a rank value range.

Specifically, the port selection information included in the second CSI may include a port quantity selected by the first network device, the first network device and the second network device may predefine a correspondence between a port quantity and a rank value range, and the first network device may determine a rank value range according to the port quantity and the predefined correspondence between a port quantity and a rank value range.

For example, the predefined correspondence between a port quantity and a rank value range may be: There are four ports, and a corresponding rank value range is from 1 to 2; there are six ports, and a corresponding rank value range is from 3 to 4; or there are eight ports, and a corresponding rank value range is from 5 to 8.

S304. The first network device sends the first signal to the second network device.

S305. The second network device determines a first measurement pilot according to the first signal, and sends the first measurement pilot to the first network device.

For example, if the port selection information included in the first signal is used to indicate the port number 1, the port number 3, the port number 6, and the port number 7, the first measurement pilot determined by the second network device may include second measurement pilots that are corresponding to the port number 1, the port number 3, the port number 6, and the port number 7 respectively and that are selected from the second measurement pilot for the 16 ports, that is, the first measurement pilot may be a subset of the second measurement pilots. Alternatively, the first measurement pilot may be a CSI-RS.

If the first signal includes the information about the subband 1, the second network device may determine that the first measurement pilot is sent only on the subband 1.

It can be figured out that in this embodiment of the present invention, the second measurement pilot may be configured in a semi-static way, while the first measurement pilot changes dynamically. For example, the second measurement pilot may be configured by the second network device by using semi-static signaling, signaling specific to a first network device group, or a policy of the second network device; the first measurement pilot changes along with a content change of the first signal.

S306. The second network device determines configuration information of the first measurement pilot.

The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Preferably, the determining, by the second network device, configuration information of the first measurement pilot specifically includes: determining, by the second network device, the configuration information of the first measurement pilot according to the first signal.

Specifically, the second network device may determine the port quantity of the first measurement pilot as N according to the first signal. The second network device may determine the period of the first measurement pilot according to the first signal and a third mapping relationship. The third mapping relationship is used to indicate a correspondence between the port quantity of the first measurement pilot and the period of the first measurement pilot. The second network device may determine the sequence information of the first measurement pilot according to the first signal and a fourth mapping relationship. The fourth mapping relationship is used to indicate a correspondence between the port quantity of the first measurement pilot and the sequence information of the first measurement pilot.

Further, the determining, by the second network device, the configuration information of the first measurement pilot according to the first signal includes: determining, by the second network device, the configuration information of the first measurement pilot according to a first signal last received.

For example, in an application scenario of this embodiment of the present invention, the method for determining, by the second network device, the configuration information of the first measurement pilot according to a first signal last received may include: determining, by the second network device, the pilot pattern of the first measurement pilot according to a PMI in the first signal last received. There is a correspondence between PMIs and pilot patterns.

In another application scenario of this embodiment of the present invention, the method for determining, by the second network device, the configuration information of the first measurement pilot according to a first signal last received may include: determining, by the first network device, the pilot pattern of the first measurement pilot according to an RI in the first signal last sent by the first network device to the second network device. There is a correspondence between RIs and pilot patterns.

It should be noted that if an RI is lower than another RI, a pilot pattern corresponding to the RI may be a subset of pilot patterns corresponding to the another RI.

S307. The second network device sends first signaling to the first network device, where the first signaling carries the configuration information of the first measurement pilot.

Optionally, the first signaling is at least one of higher layer signaling, dynamic signaling specific to the first network device, or the dynamic signaling specific to the first network device group.

The second network device may add the dynamic signaling specific to the first network device to a physical downlink control channel (PDCCH for short) or an enhanced physical downlink control channel (EPDCCH for short), and send the PDCCH or the EPDCCH to the first network device. The dynamic signaling specific to the first network device may be DL grant signaling or UL grant signaling.

Alternatively, the second network device may add the dynamic signaling specific to the first network device group to a PDCCH or an EPDCCH, and send the PDCCH or the EPDCCH to the first network device.

Further, the dynamic signaling specific to the first network device group is dynamic signaling obtained by the second network device by performing scrambling by using an identifier of a group to which the first network device belongs.

S308. The first network device determines the configuration information of the first measurement pilot.

Specifically, the first network device may determine the configuration information of the first measurement pilot according to the first signaling.

Optionally, the first network device determines the configuration information of the first measurement pilot according to higher layer signaling; or the first network device determines the configuration information of the first measurement pilot according to dynamic signaling specific to the first network device; or the first network device determines the configuration information of the first measurement pilot according to dynamic signaling specific to the first network device group.

Specifically, when all network devices in the group to which the first network device belongs share a same first measurement pilot, the determining, by the first network device, the configuration information of the first measurement pilot according to the first signaling may include: determining, by the first network device according to the higher layer signaling (the higher layer signaling carries the identifier of the group to which the first network device belongs), the identifier of the group to which the first network device belongs, and determining, according to the identifier of the group to which the first network device belongs, the configuration information of the first measurement pilot from the dynamic signaling specific to the first network device group.

When all network devices in the group to which the first network device belongs share a part of the first measurement pilot, the determining, by the first network device, the configuration information of the first measurement pilot according to the first signaling may include: determining, by the first network device according to the higher layer signaling, the identifier of the group to which the first network device belongs, and determining, according to the identifier of the group to which the first network device belongs and an identifier of the first network device, the configuration information of the first measurement pilot from the dynamic signaling specific to the first network device group.

Alternatively, the first network device may determine, according to the first signal, the identifier of the group to which the first network device belongs, and determine, according to the identifier of the group to which the first network device belongs and an identifier of the first network device, the configuration information of the first measurement pilot from the dynamic signaling specific to the first network device group.

Optionally, the determining, by the first network device according to the first signal, an identifier of the group to which the first network device belongs includes: determining, by the first network device according to the port selection information included in the second CSI and a first mapping relationship, the identifier of the group to which the first network device belongs, where the first mapping relationship is used to indicate a correspondence between a port number and the identifier of the group to which the first network device belongs; or determining, by the first network device according to the subband information included in the second CSI and a second mapping relationship, the identifier of the group to which the first network device belongs, where the second mapping relationship is used to indicate a correspondence between the subband information and the identifier of the group to which the first network device belongs; or sending, by the first network device, the first signal to the second network device, and receiving the higher layer signaling that is sent by the second network device and that carries the identifier of the group to which the first network device belongs, where the identifier of the group to which the first network device belongs is determined by the second network device according to the first signal.

Figure 4:
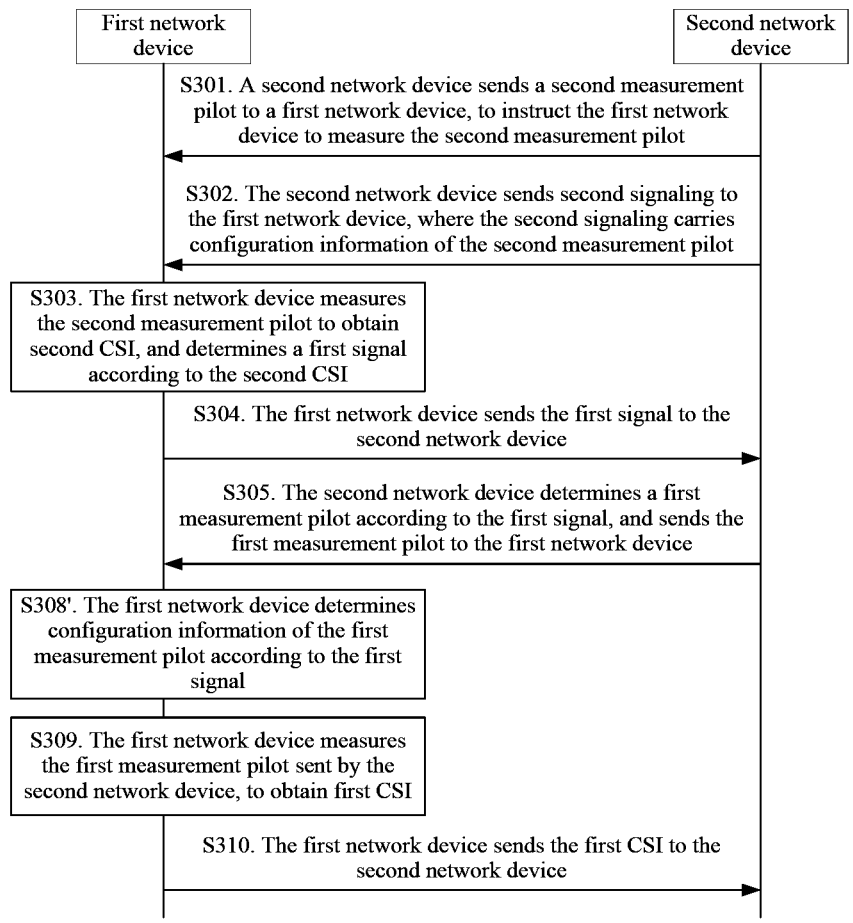
FIG. 4 is a flowchart of another CSI measurement and feedback method according to an embodiment of the present invention.

Optionally, if the second network device does not send the first signaling to the first network device, the first network device needs to determine the configuration information of the first measurement pilot on its own. As shown in FIG. 4, S306 to S308 may be replaced with S308'.

S308'. The first network device determines configuration information of the first measurement pilot according to the first signal.

The determining, by the first network device, configuration information of the first measurement pilot according to the first signal may specifically include: determining, by the first network device, the configuration information of the first measurement pilot according to a first signal last sent by the first network device to the second network device.

For example, in an application scenario of this embodiment of the present invention, the method for determining, by the first network device, the configuration information of the first measurement pilot according to a first signal last sent by the first network device to the second network device may include: determining, by the first network device, the pilot pattern of the first measurement pilot according to a PMI in the first signal last sent by the first network device to the second network device.

For example, the PMI in the first signal may be a PMI of W1.

Figure 13:
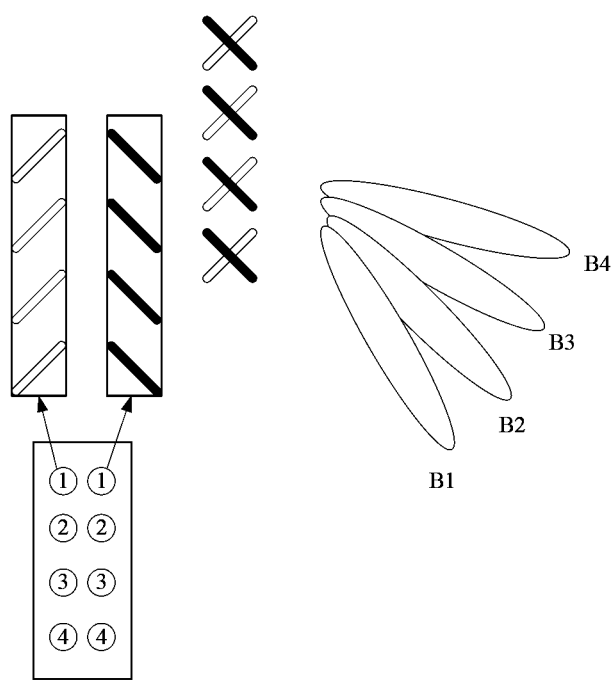
FIG. 13 is a schematic diagram of a measurement pilot according to an embodiment of the present invention.

If $$W1 = \begin{bmatrix} U & 0 \\ 0 & U \end{bmatrix}, U = [u_1\ u_2\ u_3\ u_4],$$

as shown in FIG. 13, $u_1$ is corresponding to a beam direction B1, $u_2$ is corresponding to a beam direction B2, $u_3$ is corresponding to a beam direction B3, and $u_4$ is corresponding to a beam direction B4.

A class B antenna port, that is, a port in the first measurement pilot, may be obtained by precoding a dual-polarized antenna by using W1. For example, beam directions corresponding to W1 are B1, B2, B3, and B4; in this case, among eight ports finally formed for class B, beam directions corresponding to four ports in a same polarization protection cable are B1, B2, B3, and B4 respectively. A class B configuration corresponding to B1, B2, B3, and B4, that is, a configuration of the first measurement pilot, may be configuration 1.

Figure 14:
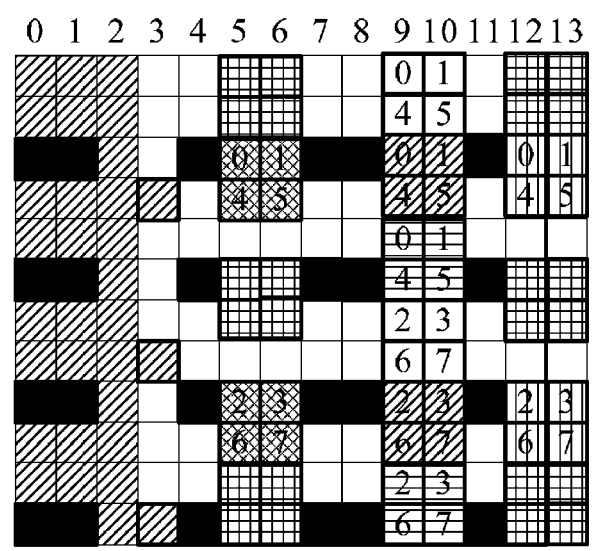
FIG. 14 is a schematic diagram of resource distribution according to an embodiment of the present invention.

For example, resource locations corresponding to configuration 1 may be locations of eight class A ports shown in FIG. 14. In addition, a subframe offset is X1, a period is Y1, X1 is a positive integer less than Y1, and Y1 is one of 5 ms, 10 ms, 20 ms, or the like.

Figure 15:
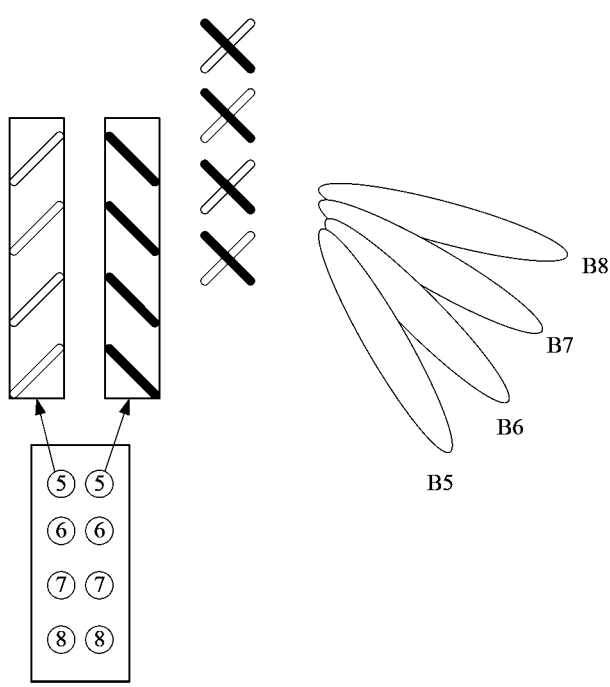
FIG. 15 is a schematic diagram of another measurement pilot according to an embodiment of the present invention.

If $$W1 = \begin{bmatrix} U & 0 \\ 0 & U \end{bmatrix}, U = [u_5 \; u_6 \; u_7 \; u_8],$$

as shown in FIG. 15, $u_5$ is corresponding to a beam direction B5, $u_6$ is corresponding to a beam direction B6, $u_7$ is corresponding to a beam direction B7, and $u_8$ is corresponding to a beam direction B8.

A class B antenna port, that is, a port in the first measurement pilot, may be obtained by precoding a dual-polarized antenna by using W1. For example, beam directions corresponding to W1 are B5, B6, B7, and B8; in this case, among eight ports finally formed for class B, beam directions corresponding to four ports in a same polarization protection cable are B5, B6, B7, and B8 respectively. A class B configuration corresponding to B5, B6, B7, and B8, that is, a configuration of the first measurement pilot, may be configuration 2.

For example, resource locations corresponding to configuration 2 may be locations of eight class B ports shown in FIG. 14. In addition, a subframe offset is X2, a period is Y2, X2 is a positive integer less than Y2, and Y2 is one of 5 ms, 10 ms, 20 ms, or the like.

In general, there is a correspondence between PMIs and pilot patterns. For example, different W s are corresponding to different pilot patterns.

Figure 16:
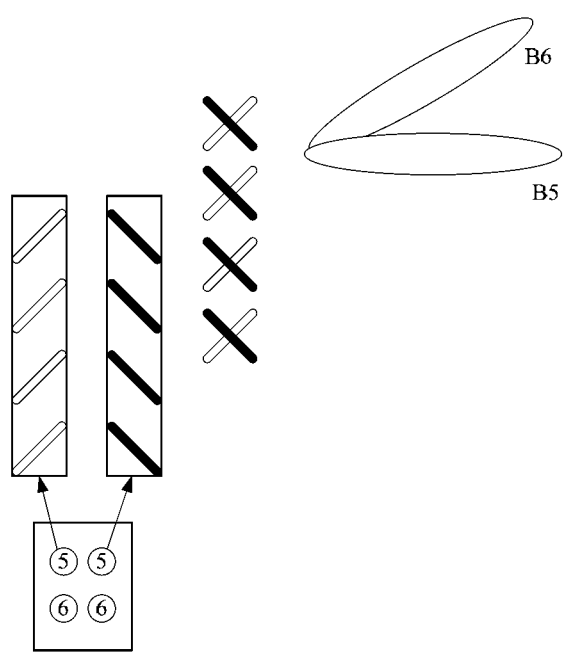
FIG. 16 is a schematic diagram of another measurement pilot according to an embodiment of the present invention.

For example, in another application scenario of this embodiment of the present invention, the first network device determines the pilot pattern of the first measurement pilot according to an RI in the first signal last sent by the first network device to the second network device. Referring to FIG. 16, there is a correspondence between RIs and pilot patterns.

It should be noted that if an RI is lower than another RI, a pilot pattern corresponding to the RI may be a subset of pilot patterns corresponding to the another RI.

Specifically, the first network device may determine the port quantity of the first measurement pilot as N according to the first signal. The first network device may determine the period of the first measurement pilot according to the first signal and a third mapping relationship. The third mapping relationship is used to indicate a correspondence between the port quantity of the first measurement pilot and the period of the first measurement pilot. The first network device may determine the sequence information of the first measurement pilot according to the first signal and a fourth mapping relationship. The fourth mapping relationship is used to indicate a correspondence between the port quantity of the first measurement pilot and the sequence information of the first measurement pilot.

It should be noted that in a CSI measurement process, the configuration information of the first measurement pilot is variable. The configuration information of the first measurement pilot may change along with a content change of the first signal. Specifically, in a CSI measurement process, the port quantity of the first measurement pilot is variable, and the port quantity of the first measurement pilot may change along with a change of a quantity of port numbers included in the second CSI.

The second measurement pilot and the first measurement pilot in this embodiment may belong to different CSI measurement processes, or may belong to a same CSI measurement process.

The first mapping relationship, the second mapping relationship, the third mapping relationship, and the fourth mapping relationship in this embodiment of the present invention may be presented in table, or may be presented in text, or certainly, may be presented in another form, and no limitation is imposed in this embodiment of the present invention.

S309. The first network device measures the first measurement pilot sent by the second network device, to obtain first CSI.

The first CSI includes at least one of a CQI, a PMI, an RI, or port selection information. The port selection information included in the first CSI is used to indicate a port number of a port selected by the first network device from ports in the first measurement pilot.

The PMI in the first CSI may include a precoding matrix W. The second network device may use a dual-polarized antenna or a single-polarized antenna.

In a first situation, the second network device uses a dual-polarized antenna.

When a rank is 1, $$W \in C = \left\{ \frac{1}{x}\begin{bmatrix} Y \\ Y \end{bmatrix}, \frac{1}{x}\begin{bmatrix} Y \\ jY \end{bmatrix}, \frac{1}{x}\begin{bmatrix} Y \\ -Y \end{bmatrix}, \frac{1}{x}\begin{bmatrix} Y \\ -jY \end{bmatrix} \right\}, \quad \text{(formula 2)}$$

$$Y \in \{e_m\};$$

when a rank is 2, $$W \in C = \left\{ \frac{1}{x}\begin{bmatrix} Y_1 & Y_2 \\ Y_1 & -Y_2 \end{bmatrix}, \frac{1}{x}\begin{bmatrix} Y_1 & Y_2 \\ jY_1 & -jY_2 \end{bmatrix} \right\}, \quad \text{(formula 3)}$$

$$(Y_1, Y_2) \in \{(e_m, e_m), (e_m, e_n)\};$$

when a rank is 3, $$W \in C = \left\{ \frac{1}{x}\begin{bmatrix} Y_1 & Y_2 \\ Y_1 & -Y_2 \end{bmatrix} \right\}, \text{ and} \quad \text{(formula 4)}$$

$(Y_1, Y_2) \in$ $$\begin{Bmatrix} (e_1, [e_1 \; e_5]) & (e_2, [e_2 \; e_6]) & (e_3, [e_3 \; e_7]) & (e_4, [e_4 \; e_8]) \\ (e_5, [e_1 \; e_5]) & (e_6, [e_2 \; e_6]) & (e_7, [e_3 \; e_7]) & (e_8, [e_4 \; e_8]) \\ ([e_1 \; e_5], e_5) & ([e_2 \; e_6], e_6) & ([e_3 \; e_7], e_7) & ([e_4 \; e_8], e_8) \\ ([e_5 \; e_1], e_1) & ([e_6 \; e_2], e_2) & ([e_7 \; e_3], e_3) & ([e_8 \; e_4], e_4) \end{Bmatrix};$$

when a rank is 4, $$W \in C = \left\{ \frac{1}{x}\begin{bmatrix} Y & Y \\ Y & -Y \end{bmatrix}, \frac{1}{x}\begin{bmatrix} Y & Y \\ jY & -jY \end{bmatrix} \right\}, \text{ and} \quad \text{(formula 5)}$$

$$Y \in \{[e_1 \; e_5], [e_2 \; e_6], [e_3 \; e_7], [e_4 \; e_8]\};$$

when a rank is 5, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \quad \text{(formula 6)}$$

$$\text{and } Y = \frac{1}{x}\begin{bmatrix} e_1 & e_1 & e_2 & e_2 & e_3 \\ e_1 & -e_1 & e_2 & -e_2 & e_3 \end{bmatrix};$$

when a rank is 6, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \quad \text{(formula 7)}$$

$$\text{and } Y = \frac{1}{x}\begin{bmatrix} e_1 & e_1 & e_2 & e_2 & e_3 & e_3 \\ e_1 & -e_1 & e_2 & -e_2 & e_3 & -e_3 \end{bmatrix};$$

when a rank is 7, $$W \in C = \left\{ \begin{bmatrix} Y^{(0)} & 0 \\ 0 & Y^{(0)} \end{bmatrix}, \begin{bmatrix} Y^{(1)} & 0 \\ 0 & Y^{(1)} \end{bmatrix}, \begin{bmatrix} Y^{(2)} & 0 \\ 0 & Y^{(2)} \end{bmatrix}, \begin{bmatrix} Y^{(3)} & 0 \\ 0 & Y^{(3)} \end{bmatrix} \right\}, \quad \text{(formula 8)}$$

$$\text{and } Y = \frac{1}{x}\begin{bmatrix} e_1 & e_1 & e_2 & e_2 & e_3 & e_3 & e_4 \\ e_1 & -e_1 & e_2 & -e_2 & e_3 & -e_3 & e_4 \end{bmatrix};$$

and
when a rank is 8, $$W \in C = \left\{ \begin{bmatrix} Y^{(0)} & 0 \\ 0 & Y^{(0)} \end{bmatrix} \right\}, \text{ and} \quad \text{(formula 9)}$$

$$Y = \frac{1}{x}\begin{bmatrix} e_1 & e_1 & e_2 & e_2 & e_3 & e_3 & e_4 & e_4 \\ e_1 & -e_1 & e_2 & -e_2 & e_3 & -e_3 & e_4 & -e_4 \end{bmatrix},$$

where C is a codebook of the precoding matrix; x is a real number related to the port quantity M of the second measurement pilot; m=1, K 4, n=1, K 4, and m≠n; and $e_m$ and $e_n$ are M/2-dimension unit column vectors, the $m^{th}$ row of $e_m$ is 1, and a row other than the $m^{th}$ row is 0.

In a second situation, the second network device uses a single-polarized antenna.

When a rank is 1, $$W \in C = \{Y\}, Y \in \{e_1, e_2, K, e_M\} \quad \text{(formula 10)}$$

when a rank is 2, $$W \in C = \{Y_1, Y_2\}, Y_1, Y_2 \in \{e_1, e_2, K, e_M\} \quad \text{(formula 11)};$$

when a rank is 3, $$W \in C = \{Y_1, Y_2, Y_3\}, Y_1, Y_2, Y_3 a \{e_1, e_2, K, e_M\} \quad \text{(formula 12)};$$

when a rank is 4, $$W \in C = \{Y_2, Y_3, Y_4\}, Y_1, Y_2, Y_3, Y_4 \in \{e_1, e_2, K, e_M\} \quad \text{(formula 13)};$$

when a rank is 5, $$W \in C = \{Y_1, Y_2, Y_3, Y_4, Y_5\}, Y_1, Y_2, Y_3, Y_4, Y_5 \in \{e_1, e_2, K, e_M\} \quad \text{(formula 14)};$$

when a rank is 6, $$W \in C = \{Y_1, Y_2, Y_3, Y_4, Y_5, Y_6\}, Y_1, Y_2, Y_3, Y_4, Y_5, Y_6 \in \{e_1, e_2, K, e_M\} \quad \text{(formula 15)};$$

when a rank is 7, $$W \in C = \{Y_1, Y_3, Y_4, Y_5, Y_6, Y_7\}, Y_1, Y_2, Y_3, Y_4, Y_5, Y_6, Y_7 \in \{e_1, e_2, K, e_M\} \quad \text{(formula 16); and}$$

when a rank is 8, $$W \in C = \{Y_1, Y_2, Y_3, Y_4, Y_5, Y_6, Y_7, Y_8\}, \text{ and}$$

$$Y_1, Y_2, Y_3, Y_4, Y_5, Y_6, Y_7, Y_8 \in \{e_1, e_2, K, e_M\} \quad \text{(formula 17)},$$

where C is a codebook of the precoding matrix, and M is the port quantity of the second measurement pilot; and $e_m$ is an M-dimension unit column vector, m=1, K M, the $m^{th}$ row of $e_m$ is 1, and a row other than the $m^{th}$ row is 0.

Optionally, the port selection information included in the second CSI is used to indicate a rank value range, and a value range of the RI included in the first CSI is the same as the rank value range indicated by the port selection information included in the second CSI.

For example, the predefined correspondence between a port quantity and a rank value range may be: There are four ports, and a corresponding rank value range is from 1 to 2; there are six ports, and a corresponding rank value range is from 3 to 4; or there are eight ports, and a corresponding rank value range is from 5 to 8.

If the port selection information included in the second CSI is used to indicate that a rank value range is from 1 to 2, the value range of the RI included in the first CSI is from 1 to 2.

If the port selection information included in the second CSI is used to indicate that the rank value range is from 3 to 4, the value range of the RI included in the first CSI is from 3 to 4.

If the port selection information included in the second CSI is used to indicate that the rank value range is from 5 to 8, the value range of the RI included in the first CSI is from 5 to 8.

Optionally, a value range of the RI included in the first CSI is determined by the first network device according to the port quantity of the first measurement pilot.

Specifically, if the quantity of ports in the first measurement pilot is 4, the value range of the RI included in the first CSI is from 1 to 2.

If the quantity of ports in the first measurement pilot is 6, the value range of the RI included in the first CSI is from 3 to 4.

If the quantity of ports in the first measurement pilot is 8, the value range of the RI included in the first CSI is from 5 to 8.

S310. The first network device sends the first CSI to the second network device.

Further, it should be noted that in this embodiment, before sending the second measurement pilot to the first network device, the second network device may precode the second measurement pilot.

In this embodiment of the present invention, the first measurement pilot may be a pilot on which precoding is performed, while the second measurement pilot is a pilot on which no precoding is performed.

It should be noted that in this embodiment, before sending the first measurement pilot to the first network device, the second network device may precode the first measurement pilot. The second network device may use a precoding matrix in the second CSI to precode the first measurement pilot.

In other words, the first measurement pilot may be a class B measurement pilot, and the second measurement pilot may be a class A measurement pilot. No precoding is performed on the class A measurement pilot, and precoding is performed on the class B measurement pilot.

Figure 5:
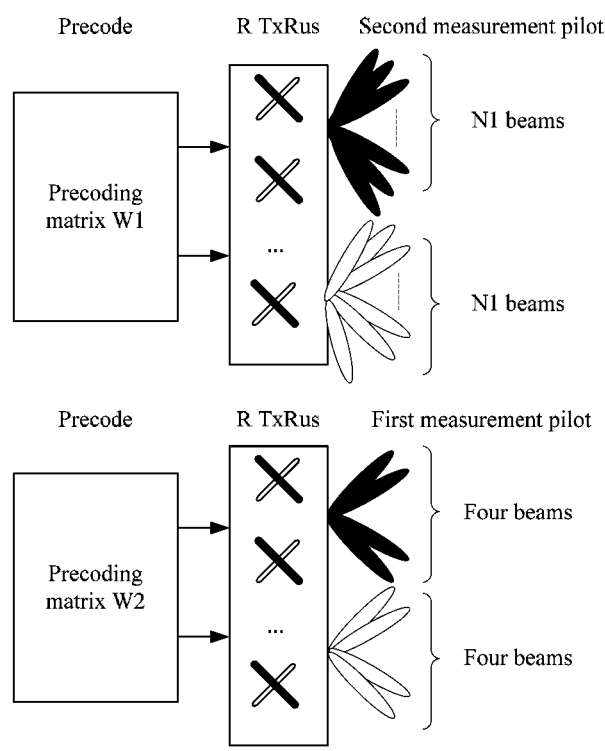
FIG. 5 is a schematic diagram of a second measurement pilot and a first measurement pilot according to an embodiment of the present invention.

For example, descriptions are provided by using an example in which the first network device is UE and the second network device is a base station. As shown in FIG. 5, assuming that a base station has R transmit and receive units (Transmit and Receive unit, TxRu for short), the base station uses a precoding matrix W1 to precode reference signals sent by the R TxRus, to obtain second measurement pilots for N1 ports. In FIG. 5, for example, a base station uses a dual-polarized antenna, a second measurement pilot corresponding to each port is corresponding to one beam. When a base station uses a dual-polarized antenna, there are two types of beams for the second measurement pilots. $W1=[w_1, w_2, L, w_{N_1}]$, $w_i$ is an R-dimension column vector, and =1, 2, L, N1. If the UE determines, after measuring the second measurement pilots for the N1 ports, that quality of beams corresponding to a port number 1, a port number 3, a port number 6, and a port number 7 is higher, and that quality of beams corresponding to other ports is very poor, the port selection information included in the second CSI reported by the UE is used to indicate the port number 1, the port number 3, the port number 6, and the port number 7. In this case, if the base station still sends measurement pilots for the other ports, because the measurement pilots occupy relatively many resource blocks, resource blocks that can be used for data transmission are reduced, and performance of the UE is affected. However, according to the method in this embodiment, the base station can send, to the UE, only measurement pilots for the four ports: the port number 1, the port number 3, the port number 6, and the port number 7, so as to reduce resources. As shown in FIG. 5, a beam corresponding to the first measurement pilot is a beam formed by the measurement pilots corresponding to the port number 1, the port number 3, the port number 6, and the port number 7. In addition, the first measurement pilot is obtained by precoding, by the base station by using a precoding matrix W2, reference signals sent by the R TxRus, and $W2=[w_1, w_3, w_6, w_7]$. In this way, the base station flexibly configures the first measurement pilot. This reduces resource blocks occupied by measurement pilots and improves performance of UE.

Further, because the port selection information included in the second CSI may be used to indicate a rank value range, for example, the port selection information included in the second CSI indicates that there are four ports, a corresponding rank (Rank) value range is from 1 to 2. In this way, when measuring the first measurement pilot, the UE needs to perform measurement only from rank 1 to rank 2. However, in the conventional art, if there are four ports, the UE needs to perform measurement from rank 1 to rank 4; if there are eight ports, the UE needs to perform measurement from rank 1 to rank 8. Compared with the conventional art, the method in this embodiment can greatly reduce a measurement range of the UE.

Figure 6:
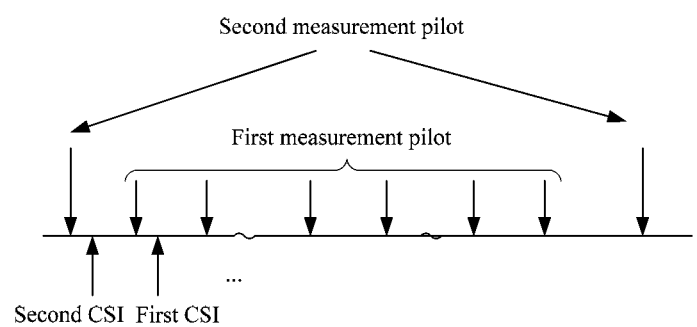
FIG. 6 is a schematic diagram of a sequence diagram of a second measurement pilot and a first measurement pilot according to an embodiment of the present invention.

Further, the first measurement pilot can reflect a long-term characteristic of a channel, and the second measurement pilot can reflect a transient characteristic of a channel. Therefore, the period of the first measurement pilot may be far less than the period of the second measurement pilot. For example, the period of the first measurement pilot may be 10 milliseconds, and the period of the second measurement pilot may be 100 milliseconds. FIG. 6 shows a sequence diagram of a second measurement pilot and a first measurement pilot. First, the base station sends the second measurement pilot to the UE. Then, the UE measures the second measurement pilot to obtain second CSI, and reports the second CSI to the base station. Then, the base station determines the first measurement pilot according to the second CSI, and sends the first measurement pilot to the UE. Then, the UE measures the first measurement pilot to obtain first CSI, and reports the first CSI to the base station.

The first network device may report the first CSI and the second CSI to the second network device in different CSI measurement processes. Certainly, the first network device may report the first CSI and the second CSI to the second network device in a same CSI measurement process.

Specifically, the method in this embodiment of the present invention may further include: reporting, by the first network device, third CSI to the second network device in a CSI measurement process. The third CSI includes the first CSI determined by measuring the first measurement pilot and the second CSI determined by measuring the second measurement pilot.

In this embodiment of the present invention, the following describes in detail information that is included in the second CSI in different implementations when the first network device reports the first CSI and the second CSI to the second network device in a same CSI measurement process.

In a first implementation, the second CSI may include a second RI and a second PMI.

In the first implementation, the first network device may report, to the second network device, all RIs and PMIs determined by measuring the second measurement pilot. The second RI and the second PMI may be fed back at a same time point, or the second RI and the second PMI may be fed back at different time points.

It should be noted that in this embodiment of the present invention, the second RI is an RI determined by measuring the second measurement pilot, and the second PMI is a PMI determined by measuring the second measurement pilot.

In a second implementation, the second CSI may include a second RI and an index corresponding to a first precoding submatrix W1 of a precoding matrix that has a double codebook structure and that is corresponding to a second PMI. The second RI and the index corresponding to the first precoding submatrix may be fed back at a same time point, or the second RI and the index corresponding to the first precoding submatrix may be fed back at different time points.

The second PMI in this embodiment of the present invention is corresponding to the precoding matrix that has the double codebook structure, that is, the second PMI includes the index corresponding to the first precoding submatrix W1 and an index corresponding to a second precoding submatrix W2. The double codebook structure herein is specifically W=W1×W2, where $$W1 = \begin{bmatrix} U & 0 \\ 0 & U \end{bmatrix},$$

and W1 is a diagonal matrix.

It should be emphasized that in the second implementation, the first network device may not need to report, to the second network device, the index corresponding to the second precoding submatrix W2 in the second PMI.

In a third implementation, the second CSI may include a range of a second RI and a second PMI. The range of the second RI and the second PMI may be fed back at a same time point, or the range of the second RI and the second PMI may be fed back at different time points.

In the third implementation, the first network device may not need to report, to the second network device, all RIs determined by measuring the second measurement pilot. Instead, the first network device makes a selection from the RIs determined by measuring the second measurement pilot, and reports, to the second network device, a range of RIs selected by the first network device.

In a fourth implementation, the second CSI may include a range of a second RI and an index corresponding to a first precoding submatrix of a precoding matrix that has a double codebook structure and that is corresponding to a second PMI. The range of the second RI and the index corresponding to the first precoding submatrix may be fed back at a same time point, or the range of the second RI and the index corresponding to the first precoding submatrix may be fed back at different time points.

In a fifth implementation, the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI. The second RI, the index corresponding to the first precoding submatrix, and the column selection information of the second precoding submatrix may be fed back at a same time point, or the second RI, the index corresponding to the first precoding submatrix, and the column selection information of the second precoding submatrix may be fed back at different time points.

It can be figured out that the first network device may further report the column selection information of the second precoding submatrix to the second network device while reporting the second RI and the index corresponding to the first precoding submatrix to the second network device, so that the second network device can precode the first measurement pilot by using a precoding matrix formed by columns indicated by the column selection information of the second precoding submatrix.

In a sixth implementation, the second CSI may include a second RI, a second PMI, and a second CQI. The second RI, the second PMI, and the second CQI are fed back at a same time point, or the second RI, the second PMI, and the second CQI are fed back at different time points.

The second CQI in this embodiment of the present invention is determined according to the second RI and the precoding matrix corresponding to the second PMI.

In a seventh implementation, the second CSI may include a second RI, an index corresponding to a first precoding submatrix of a precoding matrix that has a double codebook structure and that is corresponding to a second PMI, and a second CQI. The second RI, the index corresponding to the first precoding submatrix, and the second CQI are fed back at a same time point, or the second RI, the index corresponding to the first precoding submatrix, and the second CQI are fed back at different time points.

In an eighth implementation, the second CSI includes a range of a second RI, a second PMI, and a second CQI. The range of the second RI, the second PMI, and the second CQI are fed back at a same time point, or the range of the second RI, the second PMI, and the second CQI are fed back at different time points.

In a ninth implementation, the second CSI includes a range of a second RI, an index corresponding to a first precoding submatrix of a precoding matrix that has a double codebook structure and that is corresponding to a second PMI, and a second CQI. The range of the second RI, the index corresponding to the first precoding submatrix, and the second CQI are fed back at a same time point, or the range of the second RI, the index corresponding to the first precoding submatrix, and the second CQI are fed back at different time points.

In a tenth implementation, the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI. The second RI, the index corresponding to the first precoding submatrix, the column selection information of the second precoding submatrix, and the second CQI are fed back at a same time point, or the second RI, the index corresponding to the first precoding submatrix, the column selection information of the second precoding submatrix, and the second CQI are fed back at different time points.

When the first network device feeds back at least one of the second RI, the index corresponding to the first precoding submatrix, the index corresponding to the second precoding submatrix, or the second CQI in the second CSI to the second network device at the same time point, a joint coding manner or an independent coding manner is used for coding.

In this embodiment of the present invention, the following describes in detail information that is included in the first CSI in different implementations when the first network device reports the first CSI and the second CSI to the second network device in a same CSI measurement process.

In a first implementation, the first CSI may include a first RI, a first PMI, and a first CQI.

It should be noted that in this embodiment of the present invention, the first RI is an RI determined by measuring the first measurement pilot, the first PMI is a PMI determined by measuring the first measurement pilot, and the first CQI is a CQI determined according to the second RI and a precoding matrix corresponding to the first PMI.

In a second implementation, the first CSI may include a first PMI and a first CQI.

It should be emphasized that in the second implementation, the first network device does not need to report the first RI to the second network device.

Further, in a first application scenario of this embodiment of the present invention, the third CSI may further include a change indicator.

The change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

It can be figured out that although the first network device reports the third CSI to the second network device in a same CSI measurement process, specific reporting time points of various information, such as the first RI, the first PMI, and the first CQI, included in the first CSI of the third CSI may be different when the first network device reports the third CSI in the CSI measurement process. In addition, specific reporting time points of various information, such as the second RI, the second PMI, and the second CQI, included in the second CSI of the third CSI may also be different. Certainly, the first network device may report the change flag in the third CSI to the second network device at different time points of the CSI measurement process.

It should be noted that the first network device may feed back the change flag and the at least one of the second RI, the index corresponding to the first precoding submatrix, the index corresponding to the second precoding submatrix, or the second CQI to the second network device at a same time point; or the first network device may feed back the change flag, the second RI, and a precoding type indicator (Precoding Type Indicator, PTI) to the second network device at a same time point.

It can be figured out that the change flag may be used to instruct the first network device to change a pilot measurement manner, for example, to measure the first measurement pilot and feed back the first CSI, or to measure the second measurement pilot and feed back the second CSI.

For example, the method in this embodiment of the present invention may further include:

before the first network device reports the change flag to the second network device, measuring, by the first network device, only the first measurement pilot, and feeding back the first CSI; and after the first network device reports the change flag to the second network device, measuring, by the first network device, only the second measurement pilot, and feeding back the second CSI; or before the first network device reports the change flag to the second network device, measuring, by the first network device, only the second measurement pilot, and reporting the second CSI; and after the first network device reports the change flag to the second network device, measuring, by the first network device, only the first measurement pilot, and feeding back the first CSI; or before the first network device feeds back the change flag to the second network device, measuring, by the first network device, only the first measurement pilot, and feeding back the first CSI; and after the first network device feeds back the change flag to the second network device, measuring, by the first network device, the first measurement pilot, feeding back the first CSI, measuring the second measurement pilot, and feeding back the second CSI; or before the first network device feeds back the change flag to the second network device, measuring, by the first network device, only the second measurement pilot, and feeding back the second CSI; and after the first network device feeds back the change flag to the second network device, measuring, by the first network device, the first measurement pilot, feeding back the first CSI, measuring the second measurement pilot, and feeding back the second CSI.

Optionally, in this embodiment of the present invention, the second network device may notify the first network device of a manner used by the first network device to measure a pilot. Specifically, the method in this embodiment of the present invention may include: receiving, by the first network device, the configuration information sent by the second network device.

The configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

It can be figured out that when the change indicator or the configuration information is used to instruct the first network device to measure only the second measurement pilot and feed back the second CSI, the second CSI includes a second CQI; when the change indicator or the configuration information is used to instruct the first network device to measure only the first measurement pilot and feed back the first CSI, or measure the first measurement pilot, feed back the first CSI, measure the second measurement pilot, and feed back the second CSI, the second CSI may not include a second CQI.

For example, herein, in this embodiment of the present invention, that the first network device is UE and the second network device is a base station is used as an example. The base station may configure a hybrid CSI measurement process (Hybrid CSI Process) by using radio resource control (RRC) signaling. The hybrid CSI measurement process is used for the UE to report the first CSI and the second CSI to the base station in a same CSI measurement process. The second measurement pilot includes 16 ports, and the first measurement pilot includes eight ports.

For example, the change flag in this embodiment of the present invention is a flag of switching between a type A and a type B.

The following uses examples to describe a combination of: some implementations of the second CSI, some implementations of the first CSI, and different implementations of determining a change flag by UE, and "reporting first CSI and second CSI in a CSI measurement process" in this embodiment of the present invention.

Figure 17:
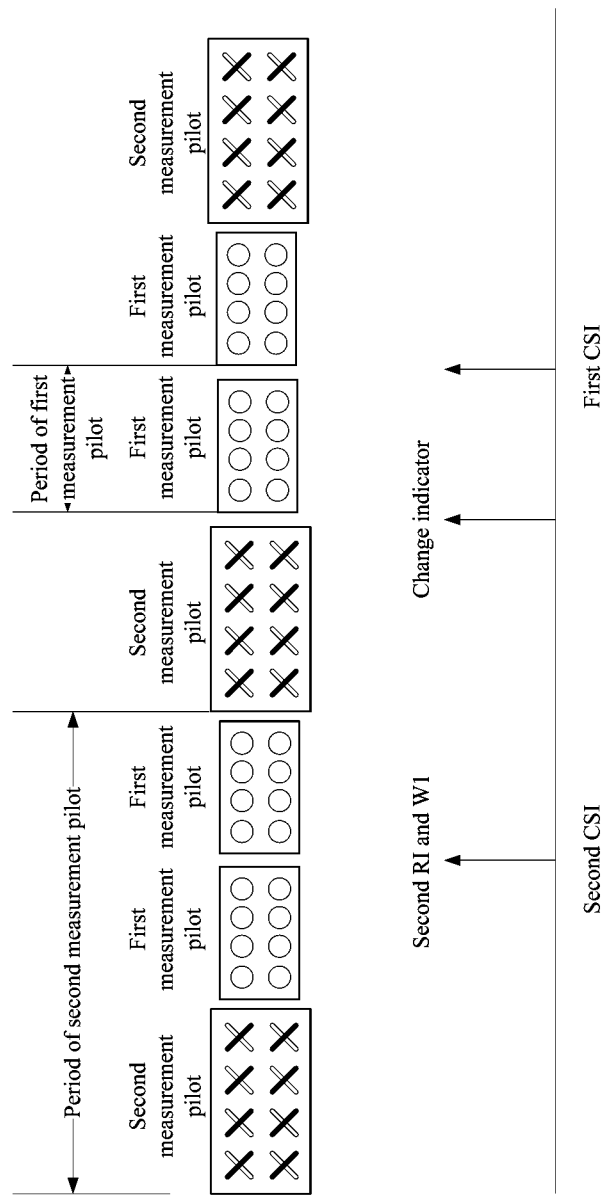
FIG. 17 is a schematic diagram of a sequence diagram of second CSI and first CSI according to an embodiment of the present invention.

As shown in FIG. 17, before the UE reports the change flag to the base station, and after the UE obtains the second CSI by measuring the second measurement pilot, the UE reports second CSI including the second RI and W1 to the base station. After the UE reports the change flag to the base station, if the measurement pilot is used to instruct the UE to measure only the first measurement pilot currently, the UE may start to measure the first measurement pilot to obtain the first CSI, and report the first CSI to the base station.

Figure 18:
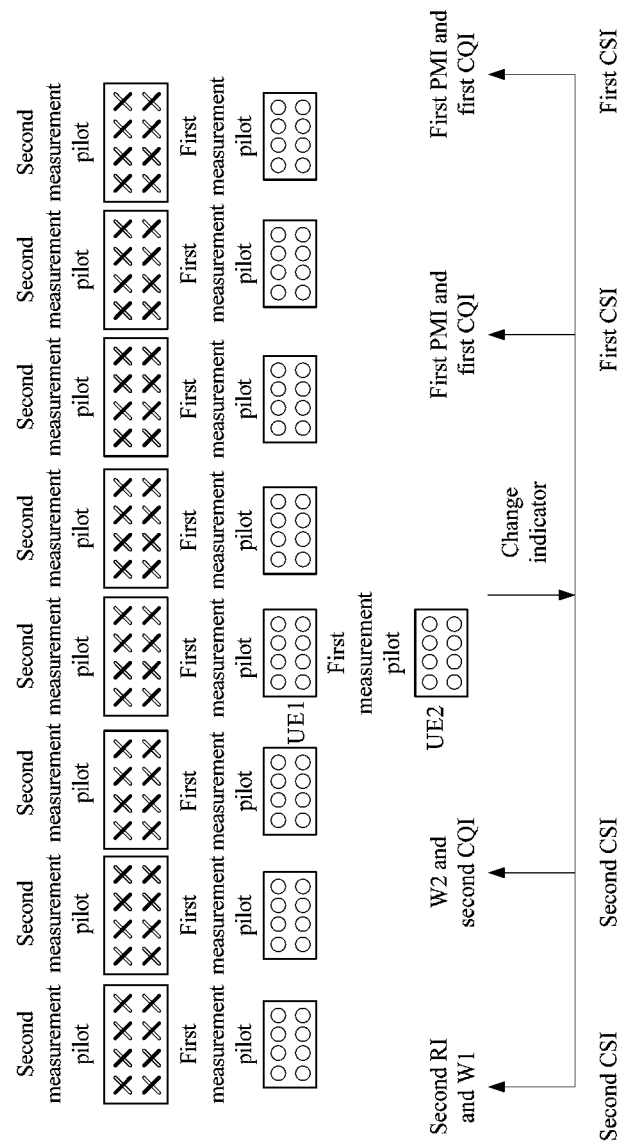
FIG. 18 is a schematic diagram of a sequence diagram of second CSI and first CSI according to an embodiment of the present invention.

As shown in FIG. 18, the base station may indicate to the UE a manner used by the UE to measure a pilot. In addition, the first CSI may include only a first PMI and a first CQI.

After the UE measures the second measurement pilot to obtain the second CSI, the UE may feed back the second RI and W1 in the second CSI to the base station. In addition, because the base station measures only the second measurement pilot currently, the UE reports, to the base station, the second CSI including the second CQI and W2. After the UE reports the change flag to the base station, if the measurement pilot is used to instruct the UE to measure only the first measurement pilot currently, the UE may start to measure the first measurement pilot to obtain the first CSI, and report the first CSI to the base station. The first CSI includes a first PMI and a first CQI.

As shown in FIG. 18, the base station may indicate to the UE a manner used by the UE to measure a pilot. In addition, the first CSI may include a first PMI, a first RI, and a first CQI.

After the UE measures the second measurement pilot to obtain the second CSI, the UE may feed back the second RI in the second CSI, W1, and column selection information of W2 to the base station. In addition, because the base station measures only the second measurement pilot currently, the UE reports, to the base station, the second CSI including the second CQI and W2. After the UE reports the change flag to the base station, if the measurement pilot is used to instruct the UE to measure only the first measurement pilot currently, the UE may start to measure the first measurement pilot to obtain the first CSI, and report the first CSI to the base station. The first CSI includes not only a first PMI and a first CQI, but also a first RI.

Figure 19:
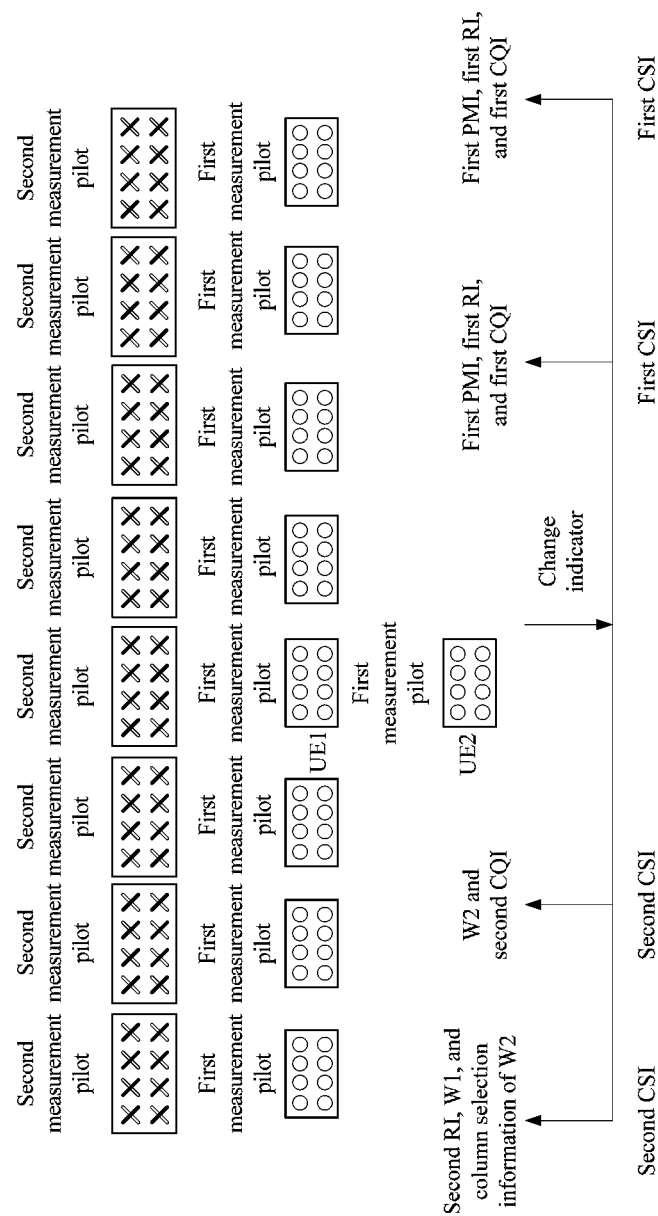
FIG. 19 is a schematic diagram of a sequence diagram of second CSI and first CSI according to an embodiment of the present invention.

In each of the foregoing three examples shown in FIG. 17 to FIG. 19, the port quantity of the first measurement pilot may be determined according to a recently reported second RI in the second CSI.

For example, in the foregoing three examples, when the second RI is 1, it indicates that a port in the first measurement pilot is a port 15; when the second RI is 2, ports in the first measurement pilot are a port 15 and a port 16; when the second RI is 3, ports in the first measurement pilot are ports 15 to 18; when the second RI is 4, ports in the first measurement pilot are ports 15 to 18.

It can be figured out that in this embodiment of the present invention, the second RI may be used to directly indicate a specific port in the first measurement pilot, and may also be used to indirectly indicate a port indication flag that can be used to determine a specific port in the first measurement pilot. For example, when the second RI is 1, it may indicate that the port indication flag is 1, and the port indication flag 1 may indicate that a port in the first measurement pilot is a port 15; when the second RI is 2, it may indicate that the port indication flag is 2, and the port indication flag 2 may indicate that ports in the first measurement pilot are a port 15 and a port 16; when the second RI is 3, it may indicate that the port indication flag is 3, and the port indication flag 3 may indicate that ports in the first measurement pilot are ports 15 to 18; when the second RI is 4, it may indicate that the port indication flag is 4, and the port indication flag 4 may indicate that ports in the first measurement pilot are ports 15 to 18.

According to the CSI measurement and feedback method provided in this embodiment of the present invention, a second network device first sends a second measurement pilot to a first network device; the first network device measures the second measurement pilot to obtain second CSI, and determines a first signal according to the second CSI; and then the first network device reports the first signal to the second network device. In this case, the second network device can adaptively configure a first measurement pilot according to the first signal fed back by the first network device. Finally, the first measurement pilot sent by the second network device to the first network device is variable, and the first measurement pilot changes along with a content change of the first signal. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 7:
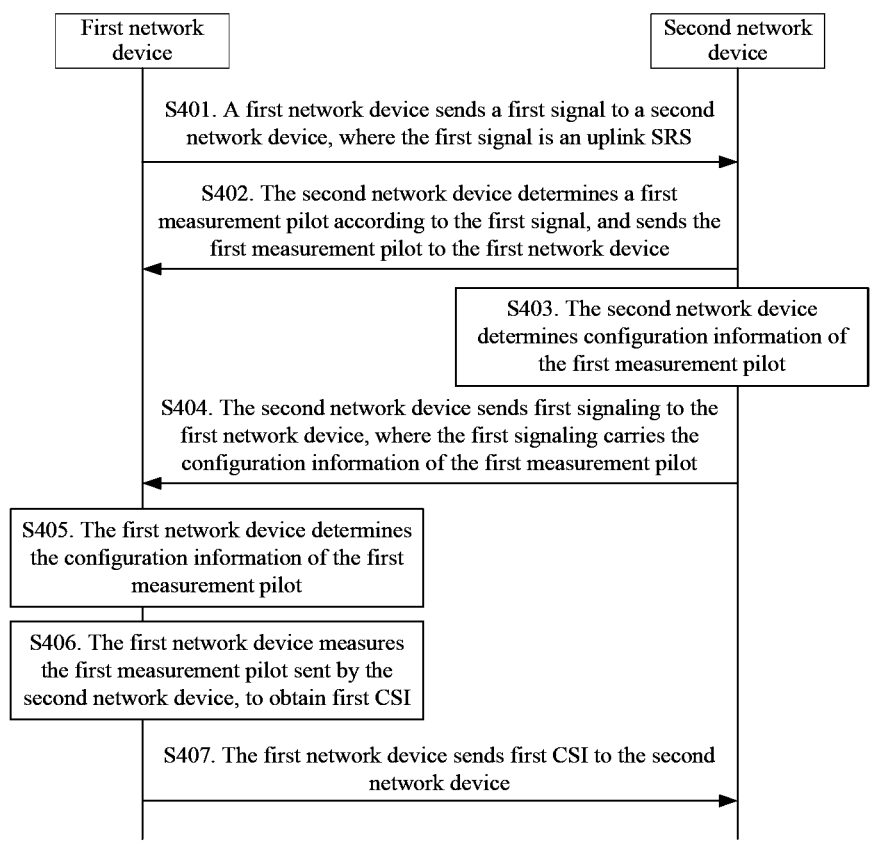
FIG. 7 is a flowchart of another CSI measurement and feedback method according to an embodiment of the present invention.

An embodiment of the present invention further provides a CSI measurement and feedback method. As shown in FIG. 7, the method includes the following steps.

S401. A first network device sends a first signal to a second network device, where the first signal is an uplink sounding reference signal (SRS for short).

The first signal is used for the second network device to determine a first measurement pilot according to the first signal, and send the first measurement pilot to the first network device. The first measurement pilot may be a CSI-RS.

Optionally, the first network device is UE, and the second network device is a base station; or the first network device is UE, and the second network device is UE; or the first network device is a base station, and the second network device is a base station. The first network device and the second network device may be network devices in other forms, and no limitation is imposed herein on specific forms of the first network device and the second network device in this embodiment of the present invention.

S402. The second network device determines a first measurement pilot according to the first signal, and sends the first measurement pilot to the first network device.

The second network device may estimate channel quality according to the SRS, and determine the first measurement pilot according to the estimated channel quality.

S403. The second network device determines configuration information of the first measurement pilot.

The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

S404. The second network device sends first signaling to the first network device, where the first signaling carries the configuration information of the first measurement pilot.

Optionally, the first signaling is higher layer signaling, or the first signaling is dynamic signaling specific to the first network device, or the first signaling is dynamic signaling specific to a first network device group.

S405. The first network device determines the configuration information of the first measurement pilot.

Specifically, the first network device may determine the configuration information of the first measurement pilot according to the first signaling.

S406. The first network device measures the first measurement pilot sent by the second network device, to obtain first CSI.

The first CSI includes at least one of a CQI, a PMI, an RI, or port selection information. The port selection information included in the first CSI is used to indicate a port number of a port selected by the first network device from ports in the first measurement pilot.

S407. The first network device sends first CSI to the second network device.

According to the CSI measurement and feedback method provided in this embodiment of the present invention, before a first network device receives a first measurement pilot sent by a second network device, the first network device sends a first signal to the second network device, and the first signal is used for the second network device to determine the first measurement pilot according to the first signal. Therefore, the first measurement pilot changes along with a content change of the first signal, that is, the first measurement pilot in this embodiment of the present invention is variable. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 8:
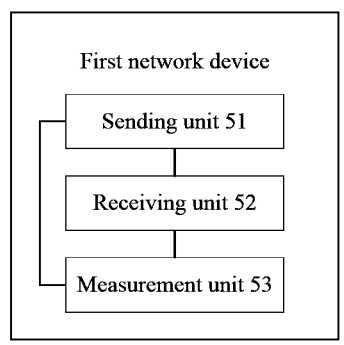
FIG. 8 is a schematic composition diagram of a first network device according to an embodiment of the present invention.

An embodiment of the present invention further provides a first network device. As shown in FIG. 8, the first network device includes a sending unit 51, a receiving unit 52, and a measurement unit 53.

The sending unit 51 is configured to send a first signal to a second network device. The first signal is used for the second network device to determine a first measurement pilot according to the first signal, and send the first measurement pilot to the first network device.

The receiving unit 52 is configured to receive the first measurement pilot sent by the second network device.

The measurement unit 53 is configured to measure the first measurement pilot to obtain first CSI. The first CSI includes at least one of a CQI, a PMI, an RI, or port selection information, and the port selection information is used to indicate a port number of a port selected by the first network device from ports in the first measurement pilot.

The sending unit 51 is further configured to send the first CSI to the second network device.

Optionally, the first signal is an SRS.

Preferably, the first signal includes second CSI sent by the sending unit 51 to the second network device, the second CSI is obtained by measuring a second measurement pilot by the measurement unit, and the second measurement pilot is a measurement pilot configured for the first network device by the second network device by using semi-static signaling or signaling specific to a first network device group.

Figure 9:
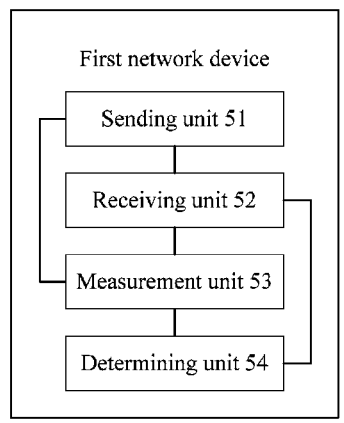
FIG. 9 is a schematic composition diagram of another first network device according to an embodiment of the present invention.

Further, as shown in FIG. 9, the first network device in this embodiment of the present invention further includes a determining unit 54.

The determining unit 54 is configured to: before the receiving unit 52 receives the first measurement pilot sent by the second network device, and the first measurement pilot is measured, determine configuration information of the first measurement pilot. The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Further, the determining unit 54 is specifically configured to determine the configuration information of the first measurement pilot according to the first signal.

Further, the determining unit 54 is specifically configured to determine the configuration information of the first measurement pilot according to a first signal last sent by the sending unit to the second network device.

Further, the determining unit 54 is specifically configured to:

determine the pilot pattern of the first measurement pilot according to a PMI in the first signal last sent by the sending unit 51 to the second network device, where there is a correspondence between PMIs and pilot patterns; or determine the pilot pattern of the first measurement pilot according to an RI in the first signal last sent by the sending unit 51 to the second network device, where there is a correspondence between RIs and pilot patterns.

Further, if an RI is lower than another RI, a pilot pattern corresponding to the RI is a subset of pilot patterns corresponding to the another RI.

Further, the receiving unit 52 is further configured to receive first signaling sent by the second network device. The first signaling carries the configuration information of the first measurement pilot.

The determining unit 54 is further configured to determine the configuration information of the first measurement pilot according to the first signaling.

The first signaling is at least one of higher layer signaling, dynamic signaling specific to the first network device, or dynamic signaling specific to the first network device group.

Further, the dynamic signaling specific to the first network device is added to a PDCCH or an EPDCCH and sent.

Further, the dynamic signaling specific to the first network device is DL grant signaling or UL grant signaling.

Further, the dynamic signaling specific to the first network device group is added to a PDCCH or an EPDCCH and sent.

Further, the dynamic signaling specific to the first network device group is dynamic signaling obtained after scrambling is performed by using an identifier of a group to which the first network device belongs.

Further, the determining unit 54 is further configured to: determine, according to the higher layer signaling, an identifier of a group to which the first network device belongs, and determine, according to the identifier of the group to which the first network device belongs, the configuration information of the first measurement pilot from the dynamic signaling specific to the first network device group; or determine, according to the higher layer signaling, an identifier of a group to which the first network device belongs, and determine, according to the identifier of the group to which the first network device belongs and an identifier of the first network device, the configuration information of the first measurement pilot from the dynamic signaling specific to the first network device group; or determine, according to the first signal, an identifier of a group to which the first network device belongs, and determine, according to the identifier of the group to which the first network device belongs and an identifier of the first network device, the configuration information of the first measurement pilot from the dynamic signaling specific to the first network device group.

Further, the determining unit 54 is further configured to: determine, according to the port selection information included in the second CSI and a first mapping relationship, the identifier of the group to which the first network device belongs, where the first mapping relationship is used to indicate a correspondence between a port number and the identifier of the group to which the first network device belongs; or determine, according to the subband information included in the second CSI and a second mapping relationship, the identifier of the group to which the first network device belongs, where the second mapping relationship is used to indicate a correspondence between the subband information and the identifier of the group to which the first network device belongs; or the receiving unit 52 is further configured to receive the identifier of the group to which the first network device belongs, where the identifier of the group to which the first network device belongs is sent by the second network device, and is determined by the second network device according to the first signal.

Further, the receiving unit 52 is further configured to: before the sending unit 51 sends the first signal to the second network device, receive the second measurement pilot sent by the second network device.

The measurement unit 53 is further configured to measure the second measurement pilot to obtain the second CSI.

The determining unit 54 is further configured to determine the first signal according to the second CSI.

Further, the port selection information included in the second CSI is used to indicate port numbers of N ports selected by the first network device from M ports, where M is a port quantity of the second measurement pilot, and N<M.

Further, the port numbers of the N ports selected by the first network device from the M ports are specifically:

first N port numbers with highest signal quality that are obtained by the first network device by measuring M second measurement pilots and sorting signal quality of the M second measurement pilots in descending order, where the first N port numbers are corresponding to the second measurement pilot.

Further, the determining unit 54 is further configured to determine the port quantity of the first measurement pilot as N according to the first signal.

Further, the determining unit 54 is further configured to determine the period of the first measurement pilot according to the first signal and a third mapping relationship. The third mapping relationship is used to indicate a correspondence between the port quantity of the first measurement pilot and the period of the first measurement pilot.

Further, the determining unit 54 is further configured to determine the sequence information of the first measurement pilot according to the first signal and a fourth mapping relationship. The fourth mapping relationship is used to indicate a correspondence between the port quantity of the first measurement pilot and the sequence information of the first measurement pilot.

Further, configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot. In a CSI measurement process, the configuration information of the second measurement pilot remains unchanged.

Further, the receiving unit 52 is further configured to: before the measurement unit 53 measures the second measurement pilot, receive second signaling sent by the second network device. The second signaling carries the configuration information of the second measurement pilot.

The determining unit 54 is further configured to determine the configuration information of the first measurement pilot according to the second signaling.

The second signaling is semi-static signaling, or the second signaling is dynamic signaling specific to the first network device group.

Optionally, the second measurement pilot and the first measurement pilot belong to different CSI measurement processes.

Optionally, the second measurement pilot and the first measurement pilot belong to a same CSI measurement process.

Further, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Further, the sending unit 51 reports third CSI in a CSI measurement process. The third CSI includes the first CSI determined by measuring the first measurement pilot and the second CSI determined by measuring the second measurement pilot.

Further, the first CSI includes a first RI, a first PMI, and a first CQI; or the first CSI includes a first PMI and a first CQI.

The first RI and the first PMI are determined by measuring the first measurement pilot, and the first CQI is a CQI determined according to the second RI and a precoding matrix corresponding to the first PMI.

Further, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points.

The second CQI is determined according to the second RI and the precoding matrix corresponding to the second PMI. The second RI and the second PMI are determined by measuring the second measurement pilot. The second PMI is corresponding to the precoding matrix that has the double codebook structure, and the second PMI includes the index corresponding to the first precoding submatrix and an index corresponding to the second precoding submatrix. The double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Further, at least one of the second RI, the index corresponding to the first precoding submatrix, the index corresponding to the second precoding submatrix, or the second CQI in the second CSI is coded in a joint coding manner or an independent coding manner, where the at least one of the second RI, the index corresponding to the first precoding submatrix, the index corresponding to the second precoding submatrix, or the second CQI in the second CSI is fed back by the sending unit 51 to the second network device at a same time point.

Further, the third CSI further includes a change indicator. The change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Further, the sending unit 51 feeds back the change flag and the at least one of the second RI, the index corresponding to the first precoding submatrix, the index corresponding to the second precoding submatrix, or the second CQI to the second network device at a same time point; or the sending unit 51 feeds back the change flag, the second RI, and a precoding type indicator PTI to the second network device at a same time point.

Further, the measurement unit 53 is further configured to: before the sending unit 51 reports the change flag to the second network device, measure only the first measurement pilot, and feed back the first CSI; and after the sending unit 51 reports the change flag to the second network device, measure only the second measurement pilot, and feed back the second CSI; or the measurement unit 53 is further configured to: before the sending unit 51 reports the change flag to the second network device, measure only the second measurement pilot, and report the second CSI; and after the sending unit 51 reports the change flag to the second network device, measure only the first measurement pilot, and feed back the first CSI.

Further, the measurement unit 53 is further configured to: before the sending unit 51 feeds back the change flag to the second network device, measure only the first measurement pilot, and feed back the first CSI; and after the sending unit 51 feeds back the change flag to the second network device, measure the first measurement pilot, feed back the first CSI, measure the second measurement pilot, and feed back the second CSI; or the measurement unit 53 is further configured to: before the sending unit 51 feeds back the change flag to the second network device, measure only the second measurement pilot, and feed back the second CSI; and after the sending unit 51 feeds back the change flag to the second network device, measure the first measurement pilot, feed back the first CSI, measure the second measurement pilot, and feed back the second CSI.

Further, the receiving unit 52 is further configured to receive the configuration information sent by the second network device.

The configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Further, in a CSI measurement process, the configuration information of the first measurement pilot is variable.

Further, in a CSI measurement process, the port quantity of the first measurement pilot is variable.

Further, the PMI in the first CSI includes a precoding matrix W. For a value of W, reference may be made to related descriptions in S309, and no details are repeated herein in this embodiment of the present invention.

Optionally, the port selection information included in the second CSI is expressed in a best-M manner. For specific descriptions of the best-M manner, reference may be made to formula 1, and no details are repeated herein in this embodiment.

Optionally, the port selection information included in the second CSI is expressed in a bit-map manner.

Optionally, the first network device is user equipment UE, and the second network device is a base station; or the first network device is UE, and the second network device is UE; or the first network device is a base station, and the second network device is a base station.

Further, the first measurement pilot is a CSI-RS.

Further, the second measurement pilot is a CSI-RS.

It should be noted that for specific descriptions of some function modules of the first network device provided in this embodiment of the present invention, reference may be made to corresponding content in the method embodiments, and no details are repeated herein in this embodiment.

According to the first network device provided in this embodiment of the present invention, before a receiving unit receives a first measurement pilot sent by a second network device, a sending unit sends a first signal to the second network device, and the first signal is used for the second network device to determine the first measurement pilot according to the first signal. Therefore, the first measurement pilot changes along with a content change of the first signal, that is, the first measurement pilot in this embodiment of the present invention is variable. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 10:
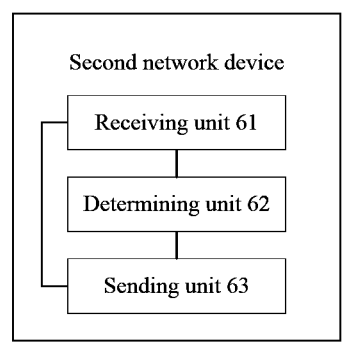
FIG. 10 is a schematic composition diagram of a second network device according to an embodiment of the present invention.

An embodiment of the present invention further provides a second network device. As shown in FIG. 10, the second network device includes a receiving unit 61, a determining unit 62, and a sending unit 63.

The receiving unit 61 is configured to receive a first signal sent by a first network device. The first signal is used for the second network device to determine a first measurement pilot according to the first signal.

The determining unit 62 is configured to determine the first measurement pilot according to the first signal.

The sending unit 63 is configured to send the first measurement pilot to the first network device.

The receiving unit 61 is further configured to receive first CSI sent by the first network device. The first CSI is obtained by measuring the first measurement pilot by the first network device, the first CSI includes at least one of a CQI, a PMI, an RI, or port selection information, and the port selection information is used to indicate a port number of a port selected by the first network device from ports in the first measurement pilot.

Further, the first signal is an uplink SRS; or the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Further, the second CSI includes at least one of a PMI, port selection information, or subband information. The port selection information included in the second CSI is used to indicate a port number of a port selected by the first network device from ports in the second measurement pilot, and the subband information is used to indicate a subband selected by the first network device from a frequency band of the second measurement pilot Further, the determining unit 62 is further configured to determine configuration information of the first measurement pilot. The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Further, the determining unit 62 is specifically configured to determine the configuration information of the first measurement pilot according to the first signal.

Further, the determining unit 62 is specifically configured to determine the configuration information of the first measurement pilot according to a first signal last received by the receiving unit 61.

Further, the determining unit 62 is specifically configured to:

determine the pilot pattern of the first measurement pilot according to a PMI in the first signal last received by the receiving unit 61, where there is a correspondence between PMIs and pilot patterns; or determine the pilot pattern of the first measurement pilot according to an RI in the first signal last received by the receiving unit 61, where there is a correspondence between RIs and pilot patterns.

Further, if an RI is lower than another RI, a pilot pattern corresponding to the RI is a subset of pilot patterns corresponding to the another RI.

Further, the sending unit 63 is further configured to: after the determining unit 62 determines the configuration information of the first measurement pilot, send first signaling to the first network device. The first signaling carries the configuration information of the first measurement pilot.

The first signaling is at least one of higher layer signaling, dynamic signaling specific to the first network device, or dynamic signaling specific to the first network device group.

Further, the sending unit 63 is specifically configured to: add the dynamic signaling specific to the first network device to a PDCCH or an EPDCCH, and send the PDCCH or the EPDCCH to the first network device.

Further, the dynamic signaling specific to the first network device is DL grant signaling or UL grant signaling.

Further, the sending unit 63 is specifically configured to: add the dynamic signaling specific to the first network device group to a PDCCH or an EPDCCH, and send PDCCH or the EPDCCH to the first network device.

Further, the dynamic signaling specific to the first network device group is dynamic signaling obtained by the second network device by performing scrambling by using an identifier of a group to which the first network device belongs.

Further, the determining unit 62 is further configured to determine, according to the first signal sent by the first network device, the identifier of the group to which the first network device belongs.

The sending unit 63 is further configured to send, to the first network device by using the higher layer signaling, the identifier of the group to which the first network device belongs.

Further, the sending unit 63 is further configured to: before the receiving unit 61 receives the first signal sent by the first network device, send the second measurement pilot to the first network device, to instruct the first network device to measure the second measurement pilot.

The sending unit 63 is further configured to send second signaling to the first network device. The second signaling carries configuration information of the second measurement pilot.

The second signaling is semi-static signaling, or the second signaling is dynamic signaling specific to the first network device group. The configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot. In a CSI measurement process, the configuration information of the second measurement pilot remains unchanged.

Further, the port selection information included in the second CSI is used to indicate port numbers of N ports selected by the first network device from M ports, where M is a port quantity of the second measurement pilot, and N<M.

Further, the determining unit 62 is further configured to determine the port quantity of the first measurement pilot as N according to the first signal.

Further, the determining unit 62 is further configured to determine the period of the first measurement pilot according to the first signal and a first mapping relationship. The first mapping relationship is used to indicate a correspondence between the port quantity of the first measurement pilot and the period of the first measurement pilot.

Further, the determining unit 62 is further configured to determine the sequence information of the first measurement pilot according to the first signal and a second mapping relationship. The second mapping relationship is used to indicate a correspondence between the port quantity of the first measurement pilot and the sequence information of the first measurement pilot.

Optionally, the second measurement pilot and the first measurement pilot belong to different CSI measurement processes.

Optionally, the second measurement pilot and the first measurement pilot belong to a same CSI measurement process.

Further, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Further, the receiving unit receives, in a CSI measurement process, third CSI reported by the first network device. The third CSI includes the first CSI determined by measuring the first measurement pilot and the second CSI determined by measuring the second measurement pilot.

Further, the first CSI includes a first RI, a first PMI, and a first CQI; or the first CSI includes a first PMI and a first CQI.

The first RI and the first PMI are determined by measuring the first measurement pilot, and the first CQI is a CQI determined according to the second RI and a precoding matrix corresponding to the first PMI.

Further, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points.

The second CQI is determined according to the second RI and the precoding matrix corresponding to the second PMI. The second RI and the second PMI are determined by measuring the second measurement pilot. The second PMI is corresponding to the precoding matrix that has the double codebook structure, and the second PMI includes the index corresponding to the first precoding submatrix and an index corresponding to the second precoding submatrix. The double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Further, at least one of the second RI, the index corresponding to the first precoding submatrix, the index corresponding to the second precoding submatrix, or the second CQI in the second CSI is coded in a joint coding manner or an independent coding manner, where the at least one of the second RI, the index corresponding to the first precoding submatrix, the index corresponding to the second precoding submatrix, or the second CQI in the second CSI is fed back by the first network device, and are received by the receiving unit 61 at a same time point.

Further, the third CSI further includes a change indicator. The change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Further, the receiving unit 61 is further configured to receive, at a same time point, the change flag and the at least one of the second RI, the index corresponding to the first precoding submatrix, the index corresponding to the second precoding submatrix, or the second CQI that are fed back by the first network device; or the receiving unit 61 is further configured to receive, at a same time point, the change flag, the second RI, and a precoding type indicator PTI, where the change flag and the second RI are fed back by the first network device.

Further, before the receiving unit 61 receives the change flag reported by the first network device, the CSI received by the receiving unit 61 is first CSI obtained by measuring only the first measurement pilot by the first network device; and after the receiving unit 61 receives the change flag reported by the first network device, the CSI received by the receiving unit 61 is second CSI obtained by measuring only the second measurement pilot by the first network device the first network device; or before the receiving unit 61 receives the change flag reported by the first network device, the CSI received by the receiving unit is second CSI obtained by measuring only the second measurement pilot by the first network device; and after the receiving unit 61 receives the change flag reported by the first network device, the CSI received by the receiving unit 61 is first CSI obtained by measuring only the first measurement pilot by the first network device; or before the receiving unit 61 receives the change flag reported by the first network device, the CSI received by the receiving unit 61 is first CSI obtained by measuring only the first measurement pilot by the first network device; and after the receiving unit 61 receives the change flag reported by the first network device, the CSI received by the receiving unit 61 includes first CSI obtained by measuring the first measurement pilot by the first network device and second CSI obtained by measuring the second measurement pilot by the first network device; or before the receiving unit 61 receives the change flag reported by the first network device, the CSI received by the receiving unit 61 is obtained by measuring only the second measurement pilot by the first network device; and after the receiving unit 61 receives the change flag reported by the first network device, the CSI received by the receiving unit 61 includes first CSI obtained by measuring the first measurement pilot by the first network device and second CSI obtained by measuring the second measurement pilot by the first network device.

Further, the sending unit 63 is further configured to send configuration information to the first network device.

The configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Further, in a CSI measurement process, the configuration information of the first measurement pilot is variable.

Further, in a CSI measurement process, the port quantity of the first measurement pilot is variable.

Further, the PMI in the first CSI includes a precoding matrix W. For a value of W, reference may be made to related descriptions in S309, and no details are repeated herein in this embodiment of the present invention.

Further, the port selection information included in the second CSI is expressed in a best-M manner, or the port selection information included in the second CSI is expressed in a bit-map manner. For specific descriptions of the best-M manner, reference may be made to formula 1, and no details are repeated herein in this embodiment.

Optionally, the first network device is UE, and the second network device is a base station; or the first network device is UE, and the second network device is UE; or the first network device is a base station, and the second network device is a base station.

Further, the first measurement pilot is a CSI-RS.

Further, the second measurement pilot is a CSI-RS.

It should be noted that for specific descriptions of some function modules of the second network device provided in this embodiment of the present invention, reference may be made to corresponding content in the method embodiments, and no details are repeated herein in this embodiment.

According to the second network device provided in this embodiment of the present invention, the second network device determines a first measurement pilot according to a first signal received from a first network device. Therefore, the first measurement pilot changes along with a content change of the first signal, that is, the first measurement pilot in this embodiment of the present invention is variable. When the first network device is UE, and the second network device is a base station, a first measurement pilot sent by the base station to the UE is determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 11:
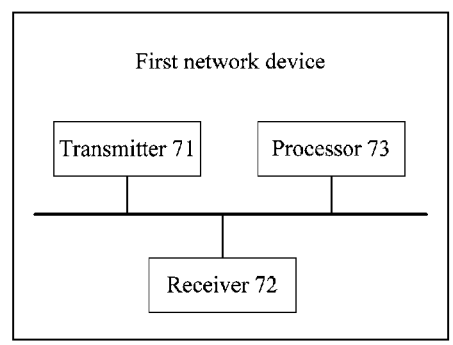
FIG. 11 is a schematic composition diagram of another first network device according to an embodiment of the present invention.

An embodiment of the present invention further provides a first network device. As shown in FIG. 11, the first network device includes a transmitter 71, a receiver 72, and a processor 73.

The transmitter 71 is configured to send a first signal to a second network device. The first signal is used for the second network device to determine a first measurement pilot according to the first signal, and send the first measurement pilot to the first network device.

The receiver 72 is configured to receive the first measurement pilot sent by the second network device.

The processor 73 is configured to: measure the first measurement pilot to obtain first CSI, and send the first CSI to the second network device. The first CSI includes at least one of a CQI, a PMI, an RI, or port selection information, and the port selection information is used to indicate a port number of a port selected by the first network device from ports in the first measurement pilot.

Optionally, the first signal is an uplink SRS.

Preferably, the first signal includes second CSI sent by the transmitter 71 to the second network device, the second CSI is obtained by measuring a second measurement pilot by the processor, and the second measurement pilot is a measurement pilot configured for the first network device by the second network device by using semi-static signaling or signaling specific to a first network device group.

Further, the second CSI includes at least one of a PMI, port selection information, or subband information.

The port selection information included in the second CSI is used to indicate a port number of a port selected by the first network device from ports in the second measurement pilot, and the subband information is used to indicate a subband selected by the first network device from a frequency band of the second measurement pilot.

Further, the processor 73 is configured to: before the receiver 72 receives the first measurement pilot sent by the second network device, and the first measurement pilot is measured, determine configuration information of the first measurement pilot. The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Further, the processor 73 is specifically configured to determine the configuration information of the first measurement pilot according to the first signal.

Further, the processor 73 is specifically configured to determine the configuration information of the first measurement pilot according to a first signal last sent by the transmitter to the second network device.

Further, the processor 73 is specifically configured to:

determine the pilot pattern of the first measurement pilot according to a PMI in the first signal last sent by the receiver 72 to the second network device, where there is a correspondence between PMIs and pilot patterns; or determine the pilot pattern of the first measurement pilot according to an RI in the first signal last sent by the receiver 72 to the second network device, where there is a correspondence between RIs and pilot patterns.

Further, if an RI is lower than another RI, a pilot pattern corresponding to the RI is a subset of pilot patterns corresponding to the another RI.

Further, the receiver 72 is further configured to receive first signaling sent by the second network device. The first signaling carries the configuration information of the first measurement pilot.

The processor 73 is further configured to determine the configuration information of the first measurement pilot according to the first signaling.

The first signaling is at least one of higher layer signaling, dynamic signaling specific to the first network device, or dynamic signaling specific to the first network device group.

Further, the dynamic signaling specific to the first network device is added to a PDCCH or an EPDCCH and sent.

Further, the dynamic signaling specific to the first network device is DL grant signaling or UL grant signaling.

Further, the dynamic signaling specific to the first network device group is added to a PDCCH or an EPDCCH and sent.

Further, the dynamic signaling specific to the first network device group is dynamic signaling obtained after scrambling is performed by using an identifier of a group to which the first network device belongs.

Further, the processor 73 is further configured to: determine, according to the higher layer signaling, an identifier of a group to which the first network device belongs, and determine, according to the identifier of the group to which the first network device belongs, the configuration information of the first measurement pilot from the dynamic signaling specific to the first network device group; or determine, according to the higher layer signaling, an identifier of a group to which the first network device belongs, and determine, according to the identifier of the group to which the first network device belongs and an identifier of the first network device, the configuration information of the first measurement pilot from the dynamic signaling specific to the first network device group; or determine, according to the first signal, an identifier of a group to which the first network device belongs, and determine, according to the identifier of the group to which the first network device belongs and an identifier of the first network device, the configuration information of the first measurement pilot from the dynamic signaling specific to the first network device group.

Further, the second CSI includes at least one of a PMI, port selection information, or subband information. The port selection information included in the second CSI is used to indicate a port number of a port selected by the first network device from ports in the second measurement pilot, and the subband information is used to indicate a subband selected by the first network device from a frequency band of the second measurement pilot Further, the processor 73 is further configured to: determine, according to the port selection information included in the second CSI and a first mapping relationship, the identifier of the group to which the first network device belongs, where the first mapping relationship is used to indicate a correspondence between a port number and the identifier of the group to which the first network device belongs; or determine, according to the subband information included in the second CSI and a second mapping relationship, the identifier of the group to which the first network device belongs, where the second mapping relationship is used to indicate a correspondence between the subband information and the identifier of the group to which the first network device belongs; or the receiver 72 is further configured to receive the identifier of the group to which the first network device belongs, where the identifier of the group to which the first network device belongs is sent by the second network device, and is determined by the second network device according to the first signal.

Further, the receiver 72 is further configured to: before the transmitter 71 sends the first signal to the second network device, receive the second measurement pilot sent by the second network device.

The processor 73 is further configured to: measure the second measurement pilot to obtain the second CSI, and determine the first signal according to the second CSI.

Further, the port selection information included in the second CSI is used to indicate port numbers of N ports selected by the first network device from M ports, where M is a port quantity of the second measurement pilot, and N<M.

Further, the processor 73 is further configured to: measure M second measurement pilots, sort signal quality of the M second measurement pilots in descending order, and select first N port numbers with highest signal quality that are corresponding to the second measurement pilot.

Further, the processor 73 is further configured to determine the port quantity of the first measurement pilot as N according to the first signal.

Further, the processor 73 is further configured to determine the period of the first measurement pilot according to the first signal and a third mapping relationship. The third mapping relationship is used to indicate a correspondence between the port quantity of the first measurement pilot and the period of the first measurement pilot.

Further, the processor 73 is further configured to determine the sequence information of the first measurement pilot according to the first signal and a fourth mapping relationship. The fourth mapping relationship is used to indicate a correspondence between the port quantity of the first measurement pilot and the sequence information of the first measurement pilot.

Further, configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot. In a CSI measurement process, the configuration information of the second measurement pilot remains unchanged.

Further, the receiver 72 is further configured to: before the processor 73 measures the second measurement pilot, receive second signaling sent by the second network device. The second signaling carries the configuration information of the second measurement pilot.

The processor 73 is further configured to determine the configuration information of the first measurement pilot according to the second signaling.

The second signaling is semi-static signaling, or the second signaling is dynamic signaling specific to the first network device group.

Optionally, the second measurement pilot and the first measurement pilot belong to different CSI measurement processes.

Optionally, the second measurement pilot and the first measurement pilot belong to a same CSI measurement process.

Further, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Further, the transmitter reports third CSI in a CSI measurement process. The third CSI includes the first CSI determined by measuring the first measurement pilot and the second CSI determined by measuring the second measurement pilot.

Further, the first CSI includes a first RI, a first PMI, and a first CQI; or the first CSI includes a first PMI and a first CQI.

The first RI and the first PMI are determined by measuring the first measurement pilot, and the first CQI is a CQI determined according to the second RI and a precoding matrix corresponding to the first PMI.

Further, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points.

The second CQI is determined according to the second RI and the precoding matrix corresponding to the second PMI. The second RI and the second PMI are determined by measuring the second measurement pilot. The second PMI is corresponding to the precoding matrix that has the double codebook structure, and the second PMI includes the index corresponding to the first precoding submatrix and an index corresponding to the second precoding submatrix. The double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second pr ng submatrix.

Further, when the transmitter 71 is further configured to feed back at least one of the second RI, the index corresponding to the first precoding submatrix, the index corresponding to the second precoding submatrix, or the second CQI in the second CSI to the second network device at the same time point, the processor 73 codes, in a joint coding manner or an independent coding manner, information sent by the transmitter 71.

Further, the third CSI further includes a change indicator. The change indicator is used to instruct the processor to measure the first measurement pilot to obtain the first CSI, and the transmitter feeds back the first CSI to the second network device; or the change indicator is used to instruct the processor to measure the second measurement pilot to obtain the second CSI, and the transmitter feeds back the second CSI to the second network device; or the change indicator is used to instruct the processor to measure the first measurement pilot to obtain the first CSI, and measure the second measurement pilot to obtain the second CSI, and the transmitter feeds back the first CSI and the second CSI to the second network device.

Further, the transmitter 71 is further configured to feed back the change flag and the at least one of the second RI, the index corresponding to the first precoding submatrix, the index corresponding to the second precoding submatrix, or the second CQI to the second network device at a same time point; or the transmitter 71 is further configured to feed back the change flag, the second RI, and a precoding type indicator PTI to the second network device at a same time point.

Further, the processor 73 is further configured to: before the transmitter 71 reports the change flag to the second network device, measure only the first measurement pilot, and feed back the first CSI; and after the transmitter 71 reports the change flag to the second network device, measure only the second measurement pilot, and feed back the second CSI; or the processor 73 is further configured to: before the transmitter 71 reports the change flag to the second network device, measure only the second measurement pilot, and report the second CSI; and after the transmitter 71 reports the change flag to the second network device, measure only the first measurement pilot, and feed back the first CSI.

Further, the processor 73 is further configured to: before the transmitter 71 feeds back the change flag to the second network device, measure only the first measurement pilot, and feed back the first CSI; and after the transmitter 71 feeds back the change flag to the second network device, measure the first measurement pilot, feed back the first CSI, measure the second measurement pilot, and feed back the second CSI; or the processor 73 is further configured to: before the transmitter 71 feeds back the change flag to the second network device, measure only the second measurement pilot, and feed back the second CSI; and after the transmitter 71 feeds back the change flag to the second network device, measure first measurement pilot, feed back the first CSI, measure the second measurement pilot, and feed back the second CSI.

Further, the receiver 72 is further configured to receive the configuration information sent by the second network device.

The configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Further, in a CSI measurement process, the configuration information of the first measurement pilot is variable.

Further, in a CSI measurement process, the port quantity of the first measurement pilot is variable.

Further, the PMI in the first CSI includes a precoding matrix W. For a value of W, reference may be made to related descriptions in S309, and no details are repeated herein in this embodiment of the present invention.

Optionally, the port selection information included in the second CSI is expressed in a best-M manner, or the port selection information included in the second CSI is expressed in a bit-map manner. For specific descriptions of the best-M manner, reference may be made to formula 1, and no details are repeated herein in this embodiment.

Optionally, the first network device is UE, and the second network device is a base station; or the first network device is UE, and the second network device is UE; or the first network device is a base station, and the second network device is a base station.

Further, the first measurement pilot is a CSI-RS.

Further, the second measurement pilot is a CSI-RS.

It should be noted that the processor 73 in this embodiment of the present invention may be an integration of function units such as the measurement unit 53 and the determining unit 54 in the foregoing embodiment. That is, the function units such as the measurement unit 53 and the determining unit 54 may be integrated in one processor 73. Alternatively, the transmitter 71 may be the sending unit 51 in the foregoing embodiment. The transmitter 71 herein may implement all functions of the sending unit 51. The receiver 72 may be the receiving unit 52 in the foregoing embodiment. The receiver 72 herein may implement all functions of the receiving unit 52.

It should be noted that for specific descriptions of some function modules of the first network device provided in this embodiment of the present invention, reference may be made to corresponding content in the method embodiments, and no details are repeated herein in this embodiment.

According to the first network device provided in this embodiment of the present invention, before a receiver receives a first measurement pilot sent by a second network device, a transmitter sends a first signal to the second network device, and the first signal is used for the second network device to determine the first measurement pilot according to the first signal. Therefore, the first measurement pilot changes along with a content change of the first signal, that is, the first measurement pilot in this embodiment of the present invention is variable. When the first network device is UE, and the second network device is a base station, a first measurement pilot measured by the UE is a measurement pilot determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

Figure 12:
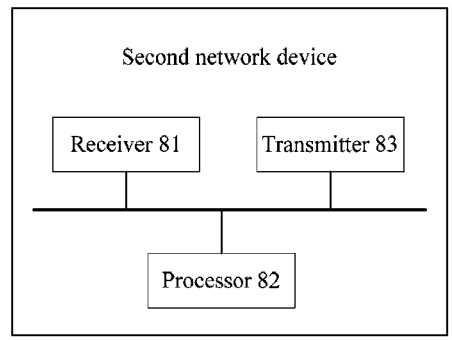
FIG. 12 is a schematic composition diagram of another second network device according to an embodiment of the present invention.

An embodiment of the present invention further provides a second network device. As shown in FIG. 12, the second network device includes a receiver 81, a processor 82, and a transmitter 83.

The receiver 81 is configured to receive a first signal sent by a first network device. The first signal is used for the second network device to determine a first measurement pilot according to the first signal.

The processor 82 is configured to determine the first measurement pilot according to the first signal.

The transmitter 83 is configured to send the first measurement pilot to the first network device.

The receiver 81 is further configured to receive first CSI sent by the first network device. The first CSI is obtained by measuring the first measurement pilot by the first network device, the first CSI includes at least one of a CQI, a PMI, an RI, or port selection information, and the port selection information is used to indicate a port number of a port selected by the first network device from ports in the first measurement pilot.

Further, the first signal is an uplink SRS; or the first signal includes second CSI reported by the first network device to the second network device, the second CSI is obtained by measuring a second measurement pilot by the first network device, and the second measurement pilot is a measurement pilot configured for the first network device by the second network device by using semi-static signaling or signaling specific to a first network device group.

Further, the second CSI includes at least one of a PMI, port selection information, or subband information. The port selection information included in the second CSI is used to indicate a port number of a port selected by the first network device from ports in the second measurement pilot, and the subband information is used to indicate a subband selected by the first network device from a frequency band of the second measurement pilot.

Further, the processor 82 is further configured to determine configuration information of the first measurement pilot. The configuration information of the first measurement pilot includes at least one of: a port quantity of the first measurement pilot, a pilot pattern of the first measurement pilot, a correspondence between a port of the first measurement pilot and a data layer quantity of the first measurement pilot, frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, or sequence information of the first measurement pilot.

Further, the processor 82 is specifically configured to determine the configuration information of the first measurement pilot according to the first signal.

Further, the processor 82 is specifically configured to determine the configuration information of the first measurement pilot according to a first signal last received by the receiver 81.

Further, the processor 82 is specifically configured to: determine the pilot pattern of the first measurement pilot according to a PMI in the first signal last received by the receiver 81, where there is a correspondence between PMIs and pilot patterns; or determine the pilot pattern of the first measurement pilot according to an RI in the first signal last received by the receiver 81, where there is a correspondence between RIs and pilot patterns.

Further, if an RI is lower than the another RI, a pilot pattern corresponding to the RI is a subset of pilot patterns corresponding to the another RI.

Further, the transmitter 83 is further configured to: after the processor 82 determines the configuration information of the first measurement pilot, send first signaling to the first network device. The first signaling carries the configuration information of the first measurement pilot.

The first signaling is higher layer signaling, or the first signaling is dynamic signaling specific to the first network device, or the first signaling is dynamic signaling specific to the first network device group.

Further, the transmitter 83 is specifically configured to: add the dynamic signaling specific to the first network device to a PDCCH or an EPDCCH, and send the PDCCH or the EPDCCH to the first network device.

Further, the dynamic signaling specific to the first network device is DL grant signaling or UL grant signaling.

Further, the transmitter 83 is specifically configured to: add the dynamic signaling specific to the first network device group to a PDCCH or an EPDCCH, and send the PDCCH or the EPDCCH to the first network device.

Further, the dynamic signaling specific to the first network device group is dynamic signaling obtained by the second network device by performing scrambling by using an identifier of a group to which the first network device belongs.

Further, the processor 82 is further configured to determine, according to the first signal sent by the first network device, the identifier of the group to which the first network device belongs.

The transmitter 83 is further configured to send, to the first network device by using the higher layer signaling, the identifier of the group to which the first network device belongs.

Further, the transmitter 83 is further configured to: before the receiver 81 receives the first signal sent by the first network device, send the second measurement pilot to the first network device, to instruct the first network device to measure the second measurement pilot.

The transmitter 83 is further configured to send second signaling to the first network device. The second signaling carries configuration information of the second measurement pilot.

The second signaling is semi-static signaling, or the second signaling is dynamic signaling specific to the first network device group. The configuration information of the second measurement pilot includes at least one of: a port quantity of the second measurement pilot, a pilot pattern of the second measurement pilot, a correspondence between a port quantity of the second measurement pilot and a data layer quantity of the second measurement pilot, frequency band information of the second measurement pilot, a period of the second measurement pilot, a subframe offset of the second measurement pilot, or sequence information of the second measurement pilot. In a CSI measurement process, the configuration information of the second measurement pilot remains unchanged.

Further, the port selection information included in the second CSI is used to indicate port numbers of N ports selected by the first network device from M ports, where M is a port quantity of the second measurement pilot, and N<M.

Further, the processor 82 is further configured to determine the port quantity of the first measurement pilot as N according to the first signal.

Further, the processor 82 is further configured to determine the period of the first measurement pilot according to the first signal and a first mapping relationship. The first mapping relationship is used to indicate a correspondence between the port quantity of the first measurement pilot and the period of the first measurement pilot.

Further, the processor 82 is further configured to determine the sequence information of the first measurement pilot according to the first signal and a second mapping relationship. The second mapping relationship is used to indicate a correspondence between the port quantity of the first measurement pilot and the sequence information of the first measurement pilot.

Optionally, the second measurement pilot and the first measurement pilot belong to different CSI measurement processes.

Optionally, the second measurement pilot and the first measurement pilot belong to a same CSI measurement process.

Further, the first measurement pilot is a pilot on which precoding is performed, and the second measurement pilot is a pilot on which no precoding is performed; or the first measurement pilot is a class B measurement pilot, and the second measurement pilot is a class A measurement pilot; or the first measurement pilot changes dynamically, and the second measurement pilot is configured in a semi-static manner.

Further, the second network device receives, in a CSI measurement process, third CSI reported by the first network device. The third CSI includes the first CSI determined by measuring the first measurement pilot and the second CSI determined by measuring the second measurement pilot.

Further, the first CSI includes a first RI, a first PMI, and a first CQI; or the first CSI includes a first PMI and a first CQI.

The first RI and the first PMI are determined by measuring the first measurement pilot, and the first CQI is a CQI determined according to the second RI and a precoding matrix corresponding to the first PMI.

Further, the second CSI includes a second RI and a second PMI, where the second RI and the second PMI are fed back at a same time point, or the second RI and the second PMI are fed back at different time points; or the second CSI includes a second RI and an index corresponding to a first precoding submatrix of a precoding matrix that has a double codebook structure and that is corresponding to a second PMI, where the second RI and the index corresponding to the first precoding submatrix are fed back at a same time point, or the second RI and the index corresponding to the first precoding submatrix are fed back at different time points; or the second CSI includes a range of a second RI and a second PMI, where the range of the second RI and the second PMI are fed back at a same time point, or the range of the second RI and the second PMI are fed back at different time points; or the second CSI includes a range of a second RI and an index corresponding to a first precoding submatrix of a precoding matrix that has a double codebook structure and that is corresponding to a second PMI, where the range of the second RI and the index corresponding to the first precoding submatrix are fed back at a same time point, or the range of the second RI and the index corresponding to the first precoding submatrix are fed back at different time points; or the second CSI includes a second RI, an index corresponding to a first precoding submatrix of a precoding matrix that has a double codebook structure and that is corresponding to a second PMI, and column selection information of a second precoding submatrix of the precoding matrix that has the double codebook structure and that is corresponding to the second PMI, where the second RI, the index corresponding to the first precoding submatrix, and the column selection information of the second precoding submatrix are fed back at a same time point; or the second RI, the index corresponding to the first precoding submatrix, and the column selection information of the second precoding submatrix are fed back at different time points; or the second CSI includes a second RI, a second PMI, and a second CQI, where the second RI, the second PMI, and the second CQI are fed back at a same time point, or the second RI, the second PMI, and the second CQI are fed back at different time points; or the second CSI includes a second RI, an index corresponding to a first precoding submatrix of a precoding matrix that has a double codebook structure and that is corresponding to a second PMI, and a second CQI, where the second RI, the index corresponding to the first precoding submatrix, and the second CQI are fed back at a same time point, or the second RI, the index corresponding to the first precoding submatrix, and the second CQI are fed back at different time points; or the second CSI includes a range of a second RI, a second PMI, and a second CQI, where the range of the second RI, the second PMI, and the second CQI are fed back at a same time point, or the range of the second RI, the second PMI, and the second CQI are fed back at different time points; or the second CSI includes a range of a second RI, an index corresponding to a first precoding submatrix of a precoding matrix that has a double codebook structure and that is corresponding to a second PMI, and a second CQI, where the range of the second RI, the index corresponding to the first precoding submatrix, and the second CQI are fed back at a same time point, or the range of the second RI, the index corresponding to the first precoding submatrix, and the second CQI are fed back at different time points; or the second CSI includes a second RI, an index corresponding to a first precoding submatrix of a precoding matrix that has a double codebook structure and that is corresponding to a second PMI, column selection information of a second precoding submatrix of the precoding matrix that has the double codebook structure and that is corresponding to the second PMI, and a second CQI, where the second RI, the index corresponding to the first precoding submatrix, the column selection information of the second precoding submatrix, and the second CQI are fed back at a same time point; or the second RI, the index corresponding to the first precoding submatrix, the column selection information of the second precoding submatrix, and the second CQI are fed back at different time points.

The second CQI is determined according to the second RI and the precoding matrix corresponding to the second PMI. The second RI and the second PMI are determined by measuring the second measurement pilot. The second PMI is corresponding to the precoding matrix that has the double codebook structure, and the second PMI includes the index corresponding to the first precoding submatrix and an index corresponding to the second precoding submatrix. The double codebook structure is W=W1×W2, where $$W1 = \begin{bmatrix} U & 0 \\ 0 & U \end{bmatrix},$$

W1 is a diagonal matrix, W1 is the first precoding submatrix, and W2 is the second precoding submatrix.

Further, when the receiver 81 receives, at a same time point, at least one of the second RI, the index corresponding to the first precoding submatrix, the index corresponding to the second precoding submatrix, or the second CQI in the second CSI fed back by the first network device, the feedback information received by the receiver 81 is coded in a joint coding manner or an independent coding manner.

Further, the third CSI further includes a change indicator.

The change indicator is used to instruct the first network device to measure the first measurement pilot and feed back the first CSI; or the change indicator is used to instruct the first network device to measure the second measurement pilot and feed back the second CSI; or the change indicator is used to instruct the first network device to: measure the first measurement pilot, feed back the first CSI, measure the second measurement pilot, and feed back the second CSI.

Further, the receiver 81 is further configured to receive, at a same time point, the change flag and the at least one of the second RI, the index corresponding to the first precoding submatrix, the index corresponding to the second precoding submatrix, or the second CQI that are fed back by the first network device; or the receiver 81 is further configured to receive the change flag, the second RI, and a precoding type indicator PTI at a same time point, where the change flag and the second RI are fed back by the first network device.

Further, before the receiver 81 receives the change flag reported by the first network device, the CSI received by the receiver 81 is first CSI obtained by measuring only the first measurement pilot by the first network device; and after the receiver 81 receives the change flag reported by the first network device, the CSI received by the receiver 81 is second CSI obtained by measuring only the second measurement pilot by the first network device the first network device; or before the receiver 81 receives the change flag reported by the first network device, the CSI received by the receiver 81 is second CSI obtained by measuring only the second measurement pilot by the first network device; and after the receiver 81 receives the change flag reported by the first network device, the CSI received by the receiver 81 is first CSI obtained by measuring only the first measurement pilot by the first network device; or before the receiver 81 receives the change flag reported by the first network device, the CSI received by the receiver 81 is first CSI obtained by measuring only the first measurement pilot by the first network device; and after the receiver 81 receives the change flag reported by the first network device, the CSI received by the receiver 81 includes first CSI obtained by measuring the first measurement pilot by the first network device and second CSI obtained by measuring the second measurement pilot by the first network device; or before the receiver 81 receives the change flag reported by the first network device, the CSI received by the receiver 81 is obtained by measuring only the second measurement pilot by the first network device; and after the receiver 81 receives the change flag reported by the first network device, the CSI received by the receiver 81 includes first CSI obtained by measuring the first measurement pilot by the first network device and second CSI obtained by measuring the second measurement pilot by the first network device.

Further, the transmitter 83 is further configured to send configuration information to the first network device.

The configuration information is used to instruct the first network device to measure the first measurement pilot and feed back the first CSI; or the configuration information is used to instruct the first network device to measure the second measurement pilot and feed back the second CSI; or the configuration information is used to instruct the first network device to: measure the first measurement pilot, feed back the first CSI, measure the second measurement pilot, and feed back the second CSI.

Further, in a CSI measurement process, the configuration information of the first measurement pilot is variable.

Further, in a CSI measurement process, the port quantity of the first measurement pilot is variable.

Further, the PMI in the first CSI includes a precoding matrix W. For a value of W, reference may be made to related descriptions in S309, and no details are repeated herein in this embodiment of the present invention.

Optionally, the port selection information included in the second CSI is expressed in a best-M manner, or the port selection information included in the second CSI is expressed in a bit-map manner. For specific descriptions of the best-M manner, reference may be made to formula 1, and no details are repeated herein in this embodiment.

Optionally, the first network device is user equipment UE, and the second network device is a base station; or the first network device is UE, and the second network device is UE; or the first network device is a base station, and the second network device is a base station.

Further, the first measurement pilot is a CSI-RS.

Further, the second measurement pilot is a CSI-RS.

It should be noted that the processor 82 in this embodiment of the present invention may be the determining unit 62 in the foregoing embodiment, and the processor 82 may implement all functions of the determining unit 62. The transmitter 83 may be the sending unit 63 in the foregoing embodiment. The transmitter 83 herein may implement all functions of the sending unit 63. The receiver 81 may be the receiving unit 61 in the foregoing embodiment. The receiver 81 herein may implement all functions of the receiving unit 61.

It should be noted that for specific descriptions of some function modules of the second network device provided in this embodiment of the present invention, reference may be made to corresponding content in the method embodiments, and no details are repeated herein in this embodiment.

According to the second network device provided in this embodiment of the present invention, the second network device determines a first measurement pilot according to a first signal received from a first network device. Therefore, the first measurement pilot changes along with a content change of the first signal, that is, the first measurement pilot in this embodiment of the present invention is variable. When the first network device is UE, and the second network device is a base station, a first measurement pilot sent by the base station to the UE is determined by the base station according to the first signal. Compared with a fixed measurement pilot configured by the base station in the conventional art, the first measurement pilot in this embodiment of the present invention is adaptively configured by the base station. Therefore, a conventional-art problem that flexibility is poor when the UE measures a measurement pilot and provides a feedback can be resolved by using the method in this embodiment of the present invention.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a specific working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the conventional art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, carried out by a first network device, for measuring and feeding back a channel state information (CSI) for a second network device, the method comprising:
sending a first signal to the second network device;
determining a configuration information of a first measurement pilot;
receiving, in response to the sending the first signal, the first measurement pilot sent by the second network device;
measuring the first measurement pilot to obtain a first CSI, wherein the first CSI comprises at least one of the group consisting of: a channel quality indicator (CQI), a precoding matrix indicator (PMI), a rank indication (RI), and a port selection information that is used to indicate a port number of a port selected by the first network device from ports in the first measurement pilot; and
sending the first CSI to the second network device,
wherein the configuration information of the first measurement pilot comprises a pilot pattern of the first measurement pilot, and
wherein the determining the configuration information of the first measurement pilot comprises performing at least one of the group consisting of:
determining the pilot pattern of the first measurement pilot according to a PMI in the first signal, wherein there is a correspondence between PMIs and pilot patterns; and
determining the pilot pattern of the first measurement pilot according to an RI in the first signal, wherein there is a correspondence between RIs and pilot patterns.

2. The method according to claim 1, wherein the first signal is an uplink sounding reference signal (SRS).

3. The method according to claim 2, wherein the determining configuration information of the first measurement pilot is performed before both the receiving the first measurement pilot sent by the second network device and the measuring the first measurement pilot, and
wherein the configuration information of the first measurement pilot further comprises at least one of the group consisting of: a port quantity of the first measurement pilot, a correspondence between a port of the first measurement pilot and a data layer quantity of the first measurement pilot, a frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, and a sequence information of the first measurement pilot.

4. The method according to claim 3, wherein, during the determining, the configuration information of the first measurement pilot is determined according to the first signal.

5. The method according to claim 4, wherein, during the determining, the first signal is a first signal last sent by the first network device to the second network device.

6. The method according to claim 3, wherein the determining the configuration information of the first measurement pilot comprises:
receiving a first signaling sent by the second network device, wherein the first signaling carries the configuration information of the first measurement pilot; and
determining the configuration information of the first measurement pilot according to the first signaling,
wherein the first signaling is at least one of the group consisting of: a higher layer signaling, a dynamic signaling specific to the first network device, and a dynamic signaling specific to the first network device group.

7. The method according to claim 1, wherein the first signal comprises a second CSI reported by the first network device to the second network device, wherein the second CSI is obtained by the first network device measuring a second measurement pilot, and wherein the second measurement pilot is a measurement pilot configured for the first network device by the second network device using semi-static signaling or signaling specific to a first network device group.

8. The method according to claim 7, wherein the second CSI-further comprises at least one of the group consisting of:
a port selection information indicating a port number of a port selected by the first network device from ports in the second measurement pilot, and
a subband information indicating a subband selected by the first network device from a frequency band of the second measurement pilot.

9. The method according to claim 1,
wherein the first CSI comprises the RI, and
wherein when the RI is lower than an another RI, a pilot pattern corresponding to the RI is a subset of pilot patterns corresponding to the another RI.

10. A first network device, comprising:
a transmitter;
a receiver; and
a processor; and
a non-transitory computer-readable medium including computer-executable instructions that, when executed by the processor, facilitate the first network device carrying out a method for measuring a feeding back a channel state information (CSI) to a second network device, the method comprising:
sending, by the transmitter cooperatively operating with the processor, a first signal to the second network device;
determining, by the processor, a configuration information of a first measurement pilot;
receiving, by the receiver cooperatively operating with the processor and in response to the sending the first signal, the first measurement pilot sent by the second network device;
measuring the first measurement pilot to obtain a first CSI, wherein the first CSI comprises at least one of the group consisting of: a channel quality indicator (CQI), a precoding matrix indicator (PMI), a rank indication (RI), and a port selection information that is used to indicate a port number of a port selected by the first network device from ports in the first measurement pilot; and sending, by the transmitter cooperatively operating with the processor, the first CSI to the second network device, wherein the configuration information of the first measurement pilot comprises a pilot pattern of the first measurement pilot, and wherein the determining the configuration information of the first measurement pilot comprises performing at least one of the group consisting of:

determining the pilot pattern of the first measurement pilot according to a PMI in the first signal, wherein there is a correspondence between PMIs and pilot patterns; and determining the pilot pattern of the first measurement pilot according to an RI in the first signal, wherein there is a correspondence between RIs and pilot patterns.

11. The first network device according to claim 10, wherein the first signal is an uplink sounding reference signal (SRS).

12. The first network device according to claim 11, wherein the determining configuration information of the first measurement pilot is performed before both the receiving the first measurement pilot sent by the second network device and the measuring the first measurement pilot, wherein the configuration information of the first measurement pilot further comprises at least one of the group consisting of: a port quantity of the first measurement pilot, a correspondence between a port of the first measurement pilot and a data layer quantity of the first measurement pilot, a frequency band information of the first measurement pilot, a period of the first measurement pilot, a subframe offset of the first measurement pilot, a start time for sending the first measurement pilot, an end time for sending the first measurement pilot, a start time for measuring the first measurement pilot, an end time for measuring the first measurement pilot, and a sequence information of the first measurement pilot.

13. The first network device according to claim 12, wherein during the determining, the configuration information of the first measurement pilot is determined according to the first signal.

14. The first network device according to claim 13, wherein during the determining, the first signal is a first signal last sent by the transmitter to the second network device.

15. The first network device according to claim 12, wherein the determining the configuration information of the first pilot comprises:

receiving, by the receiver cooperatively operating with the processor, a first signaling sent by the second network device, wherein the first signaling carries the configuration information of the first measurement pilot; and determining, by the processor, the configuration information of the first measurement pilot according to the first signaling, wherein the first signaling is at least one of the group consisting of: a higher layer signaling, a dynamic signaling specific to the first network device, and a dynamic signaling specific to the first network device group.

16. The first network device according to claim 10, wherein the first signal comprises a second CSI sent by the transmitter to the second network device, wherein the second CSI is obtained by the first network device measuring a second measurement pilot, and wherein the second measurement pilot is a measurement pilot configured for the first network device by the second network device using semi-static signaling or signaling specific to a first network device group.

17. The first network device according to claim 16, wherein the second CSI further comprises at least one of the group consisting of:

a port selection information indicating a port number of a port selected by the first network device from ports in the second measurement pilot, and a subband information indicating a subband selected by the first network device from a frequency band of the second measurement pilot.

18. The first network device according to claim 10, wherein the first CSI comprises the RI, and wherein when the RI is lower than an another RI, a pilot pattern corresponding to the RI is a subset of pilot patterns corresponding to the another RI.

* * * * *